United States Patent
Zeng et al.

(10) Patent No.: US 11,867,515 B2
(45) Date of Patent: *Jan. 9, 2024

(54) USING MEASURE OF CONSTRAINEDNESS IN HIGH DEFINITION MAPS FOR LOCALIZATION OF VEHICLES

(71) Applicant: NVIDIA Corporation, Santa Clara, CA (US)

(72) Inventors: Di Zeng, Sunnyvale, CA (US); Mengxi Wu, Mountain View, CA (US); Derik Schroeter, Fremont, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/813,543

(22) Filed: Jul. 19, 2022

(65) Prior Publication Data

US 2022/0373337 A1 Nov. 24, 2022

Related U.S. Application Data

(63) Continuation of application No. 16/919,141, filed on Jul. 2, 2020, now Pat. No. 11,391,578.
(Continued)

(51) Int. Cl.
*G01C 21/32* (2006.01)
*G01C 21/36* (2006.01)
(Continued)

(52) U.S. Cl.
CPC .......... *G01C 21/32* (2013.01); *B60W 60/001* (2020.02); *G01C 21/30* (2013.01);
(Continued)

(58) Field of Classification Search
CPC ... G01C 21/32; B60W 30/00; G06K 9/00791; G06K 9/00201; B61L 25/04;
(Continued)

(56) References Cited

U.S. PATENT DOCUMENTS 9,245,170 B1 * 1/2016 Nikic ................. G06K 9/00201
9,723,473 B2 * 8/2017 Shimizu ................ H04W 4/027
(Continued)

FOREIGN PATENT DOCUMENTS

CN 108885105 A * 11/2018 ............ B60W 30/00

OTHER PUBLICATIONS

U.S. Appl. No. 16/919,150, filed Jul. 2, 2020, titled "Determining Localization Confidence of Vehicles Based on Convergence Ranges".
(Continued)

*Primary Examiner* — Yuri Kan
(74) *Attorney, Agent, or Firm* — Maschoff Brennan

(57) ABSTRACT

According to an aspect of an embodiment, operations may comprise accessing a set of vehicle poses of one or more vehicles; for each of the set of vehicle poses, accessing a high definition (HD) map of a geographical region surrounding the vehicle pose, with the HD map comprising a three-dimensional (3D) representation of the geographical region, determining a measure of constrainedness for the vehicle pose, with the measure of constrainedness representing a confidence for performing localization for the vehicle pose based on 3D structures surrounding the vehicle pose, and storing the measure of constrainedness for the vehicle pose; and for each of the geographical regions surrounding each of the set of vehicle poses, determining a measure of constrainedness for the geographical region based on measures of constrainedness of vehicle poses within the geographical region, and storing the measure of constrainedness for the geographical region.

20 Claims, 11 Drawing Sheets

Related U.S. Application Data

(60) Provisional application No. 62/869,951, filed on Jul. 2, 2019.

(51) Int. Cl.
*G06F 16/29* (2019.01)
*B60W 60/00* (2020.01)
*G01C 21/30* (2006.01)
*G06V 20/56* (2022.01)
*G05D 1/00* (2006.01)
*G05D 1/02* (2020.01)

(52) U.S. Cl.
CPC ......... *G01C 21/3605* (2013.01); *G06F 16/29* (2019.01); *G06V 20/56* (2022.01); *B60W 60/0025* (2020.02); *B60W 2420/52* (2013.01); *G05D 1/0088* (2013.01); *G05D 1/0274* (2013.01); *G05D 2201/0213* (2013.01)

(58) Field of Classification Search
CPC ..... H04W 4/027; G06Q 50/28; G05D 1/0274; H04B 7/0617; G06F 16/29
See application file for complete search history.

(56) References Cited

U.S. PATENT DOCUMENTS

| | | | | |
|---|---|---|---|---|
| 10,098,014 | B1* | 10/2018 | Shimizu | H04B 7/0617 |
| 11,035,933 | B2* | 6/2021 | Demir | G05D 1/0274 |
| 11,391,578 | B2* | 7/2022 | Zeng | G01C 21/32 |
| 2016/0221592 | A1* | 8/2016 | Puttagunta | B61L 25/04 |
| 2019/0259182 | A1* | 8/2019 | Sarukkai | G06K 9/00791 |
| 2020/0026281 | A1* | 1/2020 | Xiao | G06Q 50/28 |
| 2022/0373337 | A1* | 11/2022 | Zeng | G06F 16/29 |

OTHER PUBLICATIONS

Natasha Gelfand, Leslie Ikemoto, Szymon Rusinkiewicz, Marc Levoy; "Geometrically Stable Sampling for the ICP Algorithm"; International Conference on 3D Digital Imaging and Modeling (3DIM); 2003; 8 pages.

Jean-Emmanuel Deschaud; "IMLS-SLAM: scan-to-model matching based on 3D data"; IEEE International Conference on Robotics and Automation (ICRA); 2018; 6 pages.

Silvere Bonnabel, Martin Barczyk and Francois Goulette; "On the Covariance of ICP-based Scan-Matching Techniques"; American Control Conference (ACC); 2016; 6 pages.

* cited by examiner

USING MEASURE OF CONSTRAINEDNESS IN HIGH DEFINITION MAPS FOR LOCALIZATION OF VEHICLES

CROSS-REFERENCE TO A RELATED APPLICATION

This patent application is a continuation of U.S. patent application Ser. No. 16/919,141, filed on Jul. 2, 2020, which claims the benefit of and priority to U.S. Provisional App. No. 62/869,951 filed Jul. 2, 2019, the disclosures of each of which are incorporated herein by this reference in their entireties.

FIELD

The embodiments discussed herein are related to maps for autonomous vehicles, and more particularly to using measure of constrainedness in high definition (HD) maps for localization of vehicles.

BACKGROUND

Autonomous vehicles, also known as self-driving cars, driverless cars, or robotic cars, may drive from a source location to a destination location without requiring a human driver to control or navigate the vehicle. Automation of driving may be difficult for several reasons. For example, autonomous vehicles may use sensors to make driving decisions on the fly, or with little response time, but vehicle sensors may not be able to observe or detect some or all inputs that may be required or useful to safely control or navigate the vehicle safely in some instances. Vehicle sensors may be obscured by corners, rolling hills, other vehicles, etc. Vehicles sensors may not observe certain inputs early enough to make decisions that may be necessary to operate the vehicle safely or to reach a desired destination. In addition, some inputs, such as lanes, road signs, or traffic signals, may be missing on the road, may be obscured from view, or may not be readily visible, and therefore may not be detectable by sensors. Furthermore, vehicle sensors may have difficulty detecting emergency vehicles, a stopped obstacle in a given lane of traffic, or road signs for rights of way.

Autonomous vehicles may use map data to discover some of the above information rather than relying on sensor data. However, conventional maps have several drawbacks that may make them difficult to use for an autonomous vehicle. For example, conventional maps may not provide the level of precision or accuracy that for navigation within a certain safety threshold (e.g., accuracy within 30 centimeters (cm) or better). Further, GPS systems may provide accuracies of approximately 3-5 meters (m) but have large error conditions that may result in accuracies of over 100 m. This lack of accuracy may make it challenging to accurately determine the location of the vehicle on a map or to identify (e.g., using a map, even a highly precise and accurate one) a vehicle's surroundings at the level of precision and accuracy desired.

Furthermore, conventional maps may be created by survey teams that may use drivers with specially outfitted survey cars with high resolution sensors that may drive around a geographic region and take measurements. The measurements may be provided to a team of map editors that may assemble one or more maps from the measurements. This process may be expensive and time consuming (e.g., taking weeks to months to create a comprehensive map). As a result, maps assembled using such techniques may not have fresh data. For example, roads may be updated or modified on a much more frequent basis (e.g., rate of roughly 5-10% per year) than a survey team may survey a given area. For example, survey cars may be expensive and limited in number, making it difficult to capture many of these updates or modifications. For example, a survey fleet may include a thousand survey cars. Due to the large number of roads and the drivable distance in any given state in the United States, a survey fleet of a thousand cars may not cover the same area at the same frequency of road changes to keep the map up to date on a regular basis and to facilitate safe self-driving of autonomous vehicles. As a result, conventional techniques of maintaining maps may be unable to provide data that is sufficiently accurate and up to date for the safe navigation of autonomous vehicles.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, operations may comprise accessing a set of vehicle poses of one or more vehicles, with each of the set of vehicle poses comprising a geographic location and an orientation of the vehicle. The operations may also comprise, for each of the set of vehicle poses, accessing a high definition (HD) map of a geographical region surrounding the vehicle pose, with the HD map comprising a three-dimensional (3D) representation of the geographical region, determining a measure of constrainedness for the vehicle pose, with the measure of constrainedness representing a confidence for performing localization for the vehicle pose based on 3D structures surrounding the vehicle pose, and storing the measure of constrainedness for the vehicle pose. The operations may also comprise, for each of the geographical regions surrounding each of the set of vehicle poses, determining a measure of constrainedness for the geographical region based on measures of constrainedness of vehicle poses within the geographical region, and storing the measure of constrainedness for the geographical region.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Overview

Figure 1:
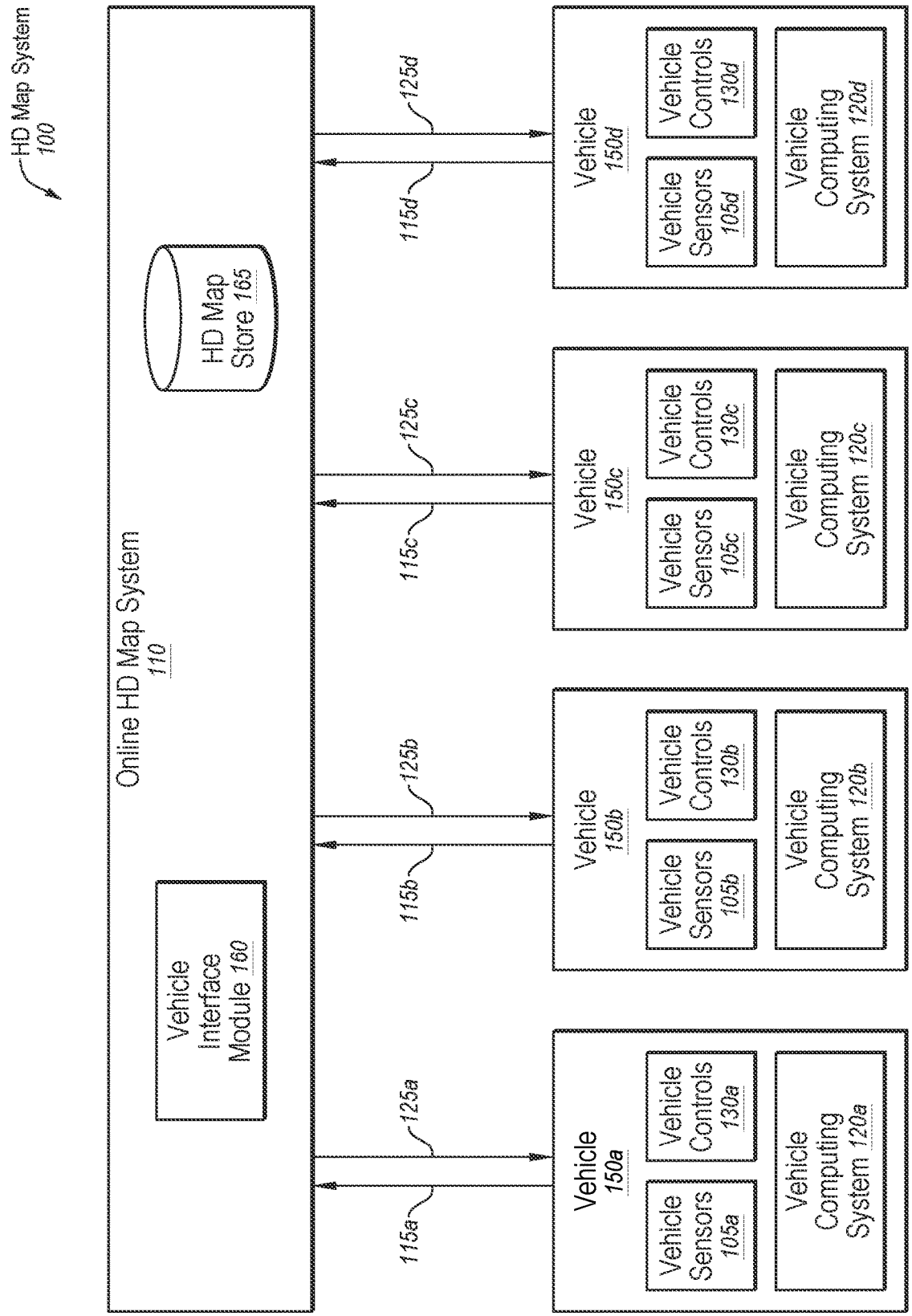
FIG. 1 illustrates an example overall system environment of an HD map system interacting with multiple vehicle computing systems.

Embodiments of the present disclosure may maintain high definition (HD) maps that may include up-to-date information with high accuracy or precision. The HD maps may be used by an autonomous vehicle to safely navigate to various destinations without human input or with limited human input. In the present disclosure reference to "safe navigation" may refer to performance of navigation within a target safety threshold. For example, the target safety threshold may be a certain number of driving hours without an accident. Such thresholds may be set by automotive manufacturers or government agencies. Additionally, reference to "up-to-date" information does not necessarily mean absolutely up-to-date, but up-to-date within a target threshold amount of time. For example, a target threshold amount of time may be one week or less such that a map that reflects any potential changes to a roadway that may have occurred within the past week may be considered "up-to-date". Such target threshold amounts of time may vary anywhere from one month to 1 minute, or possibly even less.

The autonomous vehicle may be a vehicle capable of sensing its environment and navigating without human input. An HD map may refer to a map that may store data with high precision and accuracy, for example, with accuracies of approximately 2-30 cm.

Some embodiments may generate HD maps that may contain spatial geometric information about the roads on which the autonomous vehicle may travel. Accordingly, the generated HD maps may include the information that may allow the autonomous vehicle to navigate safely without human intervention. Some embodiments may gather and use data from the lower resolution sensors of the self-driving vehicle itself as it drives around rather than relying on data that may be collected by an expensive and time-consuming mapping fleet process that may include a fleet of vehicles outfitted with high resolution sensors to create HD maps. The autonomous vehicles may have no prior map data for these routes or even for the region. Some embodiments may provide location as a service (LaaS) such that autonomous vehicles of different manufacturers may gain access to the most up-to-date map information collected, obtained, or created via the aforementioned processes.

Some embodiments may generate and maintain HD maps that may be accurate and may include up-to-date road conditions for safe navigation of the autonomous vehicle. For example, the HD maps may provide the current location of the autonomous vehicle relative to one or more lanes of roads precisely enough to allow the autonomous vehicle to drive safely in and to maneuver safety between one or more lanes of the roads.

HD maps may store a very large amount of information, and therefore may present challenges in the management of the information. For example, an HD map for a given geographic region may be too large to store on a local storage of the autonomous vehicle. Some embodiments may provide a portion of an HD map to the autonomous vehicle that may allow the autonomous vehicle to determine its current location in the HD map, determine the features on the road relative to the autonomous vehicle's position, determine if it is safe to move the autonomous vehicle based on physical constraints and legal constraints, etc. Examples of such physical constraints may include physical obstacles, such as walls, barriers, medians, curbs, etc. and examples of legal constraints may include an allowed direction of travel for a lane, lane restrictions, speed limits, yields, stops, following distances, etc.

Some embodiments of the present disclosure may allow safe navigation for an autonomous vehicle by providing relatively low latency, for example, 5-40 milliseconds or less, for providing a response to a request; high accuracy in terms of location, for example, accuracy within 30 cm or better; freshness of data such that a map may be updated to reflect changes on the road within a threshold time frame, for example, within days, hours, minutes or seconds; and storage efficiency by reducing or minimizing the storage used by the HD Map.

Some embodiments of the present disclosure may enable using measure of constrainedness in HD maps for localization of vehicles. For example, when a vehicle begins navigation along a road, and at various other time during the navigation of the vehicle, a measure of constrainedness for a geographical region through which the vehicle is navigating may be used, along with sensor data, for localization of the vehicle (e.g., in LIDAR-based localization, camera-based localization, or localization based on some other vehicle sensor or combination of sensors). In some embodiments, the measure of constrainedness may indicate how well a vehicle pose can be constrained within a geographical region. For example, if there are several 3D structures with distinct features that are observable from a vehicle location (e.g., in urban settings with plenty of buildings and other structures), the vehicle location may be well constrained, and localization may be performed with high accuracy. Alternatively, if there are very few or no 3D structures with distinct features (e.g., in large parking lots, wide open areas, and along certain highway stretches), localization may not be performed with high accuracy and the map constrainedness may low in that geographical region. The measure of constrainedness may thus be used to perform localization, for example, when an autonomous vehicle is driving. In some embodiments, the measure of constrainedness for the geographical region may be employed as a measure of uncertainty in a Kalman filter used for localization of the vehicle navigating through the geographical region. Some embodiments disclosed herein may then use the localization of an autonomous vehicle for navigating the autonomous vehicle.

Embodiments of the present disclosure are explained with reference to the accompanying drawings.

System Environment of HD Map System

FIG. 1 illustrates an example overall system environment of an HD map system 100 that may interact with multiple vehicles, according to one or more embodiments of the present disclosure. The HD map system 100 may comprise an online HD map system 110 that may interact with a plurality of vehicles 150 (e.g., vehicles 150*a-d*) of the HD map system 100. The vehicles 150 may be autonomous vehicles or non-autonomous vehicles.

The online HD map system 110 may be configured to receive sensor data that may be captured by sensors of the vehicles 150 and combine data received from the vehicles 150 to generate and maintain HD maps. The online HD map system 110 may be configured to send HD map data to the vehicles 150 for use in driving the vehicles 150. In some embodiments, the online HD map system 110 may be implemented as a distributed computing system, for example, a cloud-based service that may allow clients such as a vehicle computing system 120 (e.g., vehicle computing systems 120*a-d*) to make requests for information and services. For example, a vehicle computing system 120 may make a request for HD map data for driving along a route and the online HD map system 110 may provide the requested HD map data to the vehicle computing system 120.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
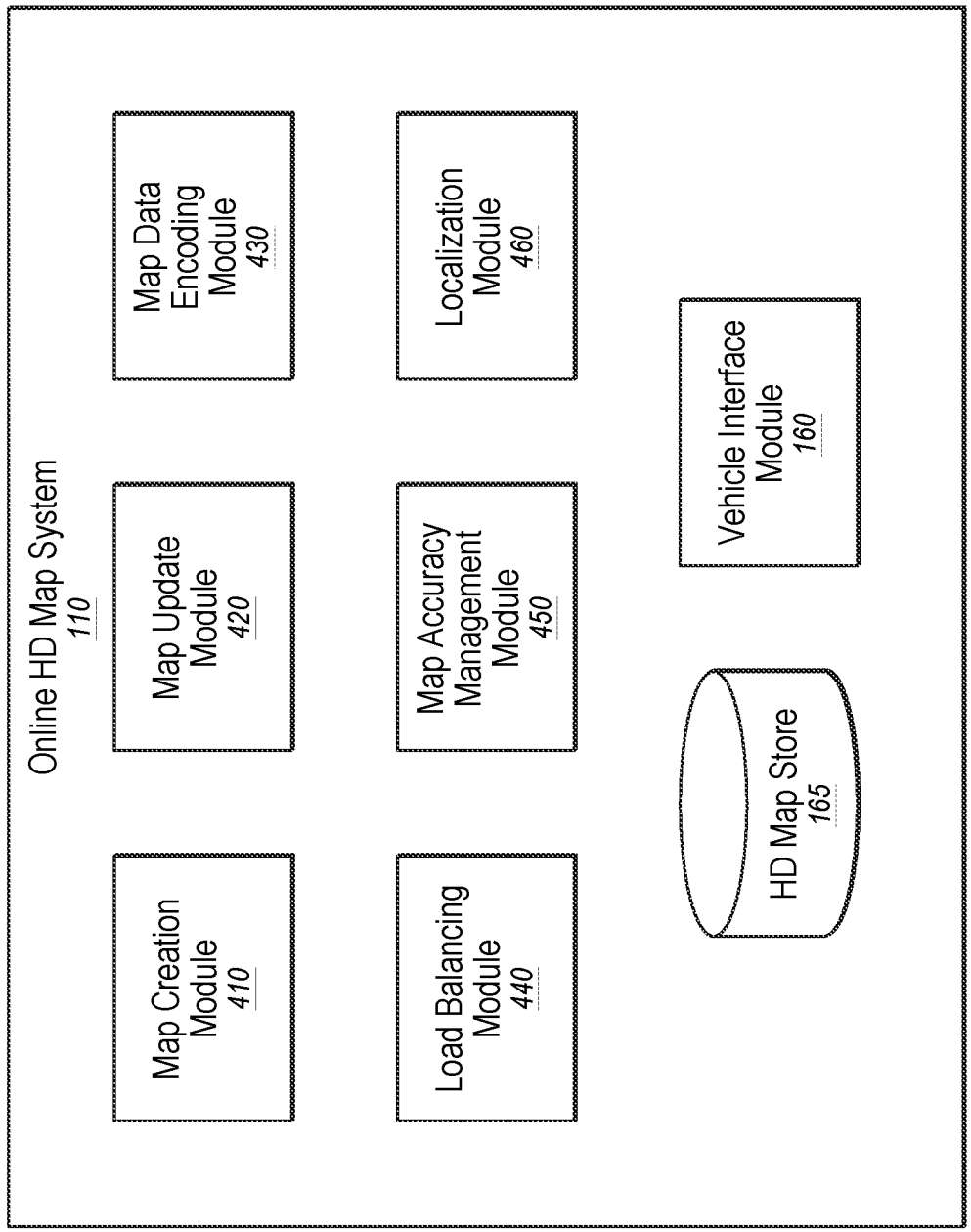
FIG. 4 illustrates an example of system architecture of an online HD map system.

The online HD map system 110 may comprise a vehicle interface module 160 and an HD map store 165. The online HD map system 110 may be configured to interact with the vehicle computing system 120 of various vehicles 150 using the vehicle interface module 160. The online HD map system 110 may be configured to store map information for various geographical regions in the HD map store 165. The online HD map system 110 may be configured to include other modules than those illustrated in FIG. 1, for example, various other modules as illustrated in FIG. 4 and further described herein.

In the present disclosure, a module may include code and routines configured to enable a corresponding system (e.g., a corresponding computing system) to perform one or more of the operations described therewith. Additionally or alternatively, any given module may be implemented using hardware including any number of processors, microprocessors (e.g., to perform or control performance of one or more operations), field-programmable gate arrays (FPGAs), application-specific integrated circuits (ASICs) or any suitable combination of two or more thereof. Alternatively or additionally, any given module may be implemented using a combination of hardware and software. In the present disclosure, operations described as being performed by a module may include operations that the module may direct a corresponding system to perform.

Further, the differentiation and separation of different modules indicated in the present disclosure is to help with explanation of operations being performed and is not meant to be limiting. For example, depending on the implementation, the operations described with respect to two or more of the modules described in the present disclosure may be performed by what may be considered as a same module. Further, the operations of one or more of the modules may be divided among what may be considered one or more other modules or submodules depending on the implementation.

The online HD map system 110 may be configured to receive sensor data collected by sensors of a plurality of vehicles 150, for example, hundreds or thousands of cars. The sensor data may include any data that may be obtained by sensors of the vehicles that may be related to generation of HD maps. For example, the sensor data may include LIDAR data, captured images, etc. Additionally or alternatively, the sensor data may include information that may describe the current state of the vehicle 150, the location and motion parameters of the vehicles 150, etc.

The vehicles 150 may be configured to provide the sensor data 115 that may be captured while driving along various routes and to send it to the online HD map system 110. The online HD map system 110 may be configured to use the sensor data 115 received from the vehicles 150 to create and update HD maps describing the regions in which the vehicles 150 may be driving. The online HD map system 110 may be configured to build high definition maps based on the collective sensor data 115 that may be received from the vehicles 150 and to store the HD map information in the HD map store 165.

The online HD map system 110 may be configured to send HD map data to the vehicles 150 at the request of the vehicles 150.

For example, in instances in which a particular vehicle 150 is scheduled to drive along a route, the particular vehicle computing system 120 of the particular vehicle 150 may be configured to provide information describing the route being travelled to the online HD map system 110. In response, the online HD map system 110 may be configured to provide HD map data of HD maps related to the route (e.g., that represent the area that includes the route) that may facilitate navigation and driving along the route by the particular vehicle 150.

In an embodiment, the online HD map system 110 may be configured to send portions of the HD map data to the vehicles 150 in a compressed format so that the data transmitted may consume less bandwidth. The online HD map system 110 may be configured to receive from various vehicles 150, information describing the HD map data that may be stored at a local HD map store (e.g., the local HD map store 275 of FIG. 2) of the vehicles 150.

In some embodiments, the online HD map system 110 may determine that the particular vehicle 150 may not have certain portions of the HD map data stored locally in a local HD map store of the particular vehicle computing system 120 of the particular vehicle 150. In these or other embodiments, in response to such a determination, the online HD map system 110 may be configured to send a particular portion of the HD map data to the vehicle 150.

In some embodiments, the online HD map system 110 may determine that the particular vehicle 150 may have previously received HD map data with respect to the same geographic area as the particular portion of the HD map data. In these or other embodiments, the online HD map system 110 may determine that the particular portion of the HD map data may be an updated version of the previously received HD map data that was updated by the online HD map system 110 since the particular vehicle 150 last received the previous HD map data. In some embodiments, the online HD map system 110 may send an update for that portion of the HD map data that may be stored at the particular vehicle 150. This may allow the online HD map system 110 to reduce or minimize the amount of HD map data that may be communicated with the vehicle 150 and also to keep the HD map data stored locally in the vehicle updated on a regular basis.

The vehicle 150 may include vehicle sensors 105 (e.g., vehicle sensors 105*a-d*), vehicle controls 130 (e.g., vehicle controls 130*a-d*), and a vehicle computing system 120 (e.g., vehicle computer systems 120a-d). The vehicle sensors 105 may be configured to detect the surroundings of the vehicle 150. In these or other embodiments, the vehicle sensors 105 may detect information describing the current state of the vehicle 150, for example, information describing the location and motion parameters of the vehicle 150.

The vehicle sensors 105 may comprise a camera, a light detection and ranging sensor (LIDAR), a global navigation satellite system (GNSS) receiver, for example, a global positioning system (GPS) navigation system, an inertial measurement unit (IMU), and others. The vehicle sensors 105 may include one or more cameras that may capture images of the surroundings of the vehicle. A LIDAR may survey the surroundings of the vehicle by measuring distance to a target by illuminating that target with a laser light pulses and measuring the reflected pulses. The GPS navigation system may determine the position of the vehicle 150 based on signals from satellites. The IMU may include an electronic device that may be configured to measure and report motion data of the vehicle 150 such as velocity, acceleration, direction of movement, speed, angular rate, and so on using a combination of accelerometers and gyroscopes or other measuring instruments.

The vehicle controls 130 may be configured to control the physical movement of the vehicle 150, for example, acceleration, direction change, starting, stopping, etc. The vehicle controls 130 may include the machinery for controlling the accelerator, brakes, steering wheel, etc. The vehicle computing system 120 may provide control signals to the vehicle controls 130 on a regular and/or continuous basis and may cause the vehicle 150 to drive along a selected route.

The vehicle computing system 120 may be configured to perform various tasks including processing data collected by the sensors as well as map data received from the online HD map system 110. The vehicle computing system 120 may also be configured to process data for sending to the online HD map system 110. An example of the vehicle computing system 120 is further illustrated in FIG. 2 and further described in connection with FIG. 2.

The interactions between the vehicle computing systems 120 and the online HD map system 110 may be performed via a network, for example, via the Internet. The network may be configured to enable communications between the vehicle computing systems 120 and the online HD map system 110. In some embodiments, the network may be configured to utilize standard communications technologies and/or protocols. The data exchanged over the network may be represented using technologies and/or formats including the hypertext markup language (HTML), the extensible markup language (XML), etc. In addition, all or some of links may be encrypted using conventional encryption technologies such as secure sockets layer (SSL), transport layer security (TLS), virtual private networks (VPNs), Internet Protocol security (IPsec), etc. In some embodiments, the entities may use custom and/or dedicated data communications technologies.

Vehicle Computing System

Figure 2:
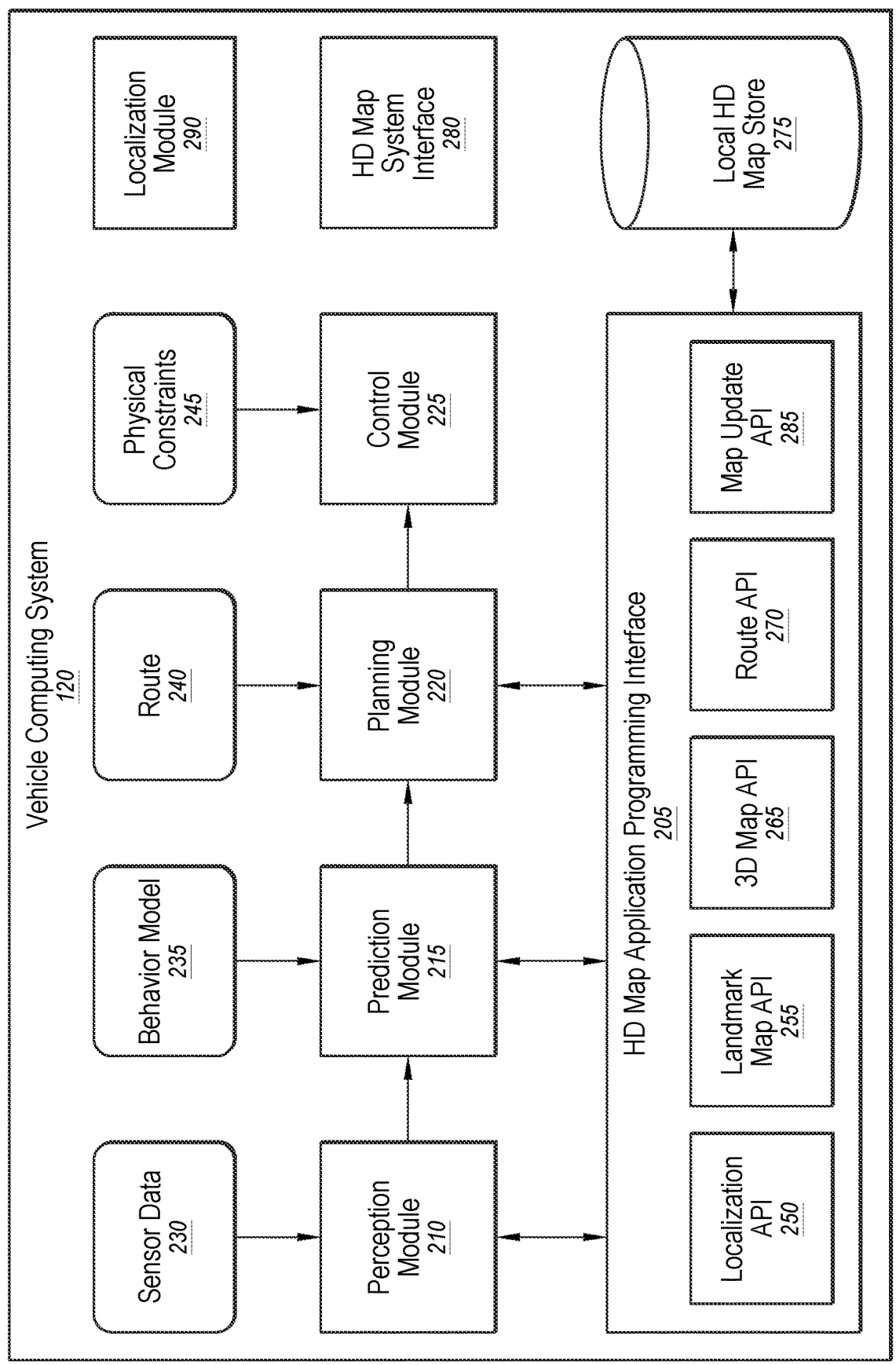
FIG. 2 illustrates an example system architecture of a vehicle computing system.

FIG. 2 illustrates an example system architecture of the vehicle computing system 120. The vehicle computing system 120 may include a perception module 210, a prediction module 215, a planning module 220, a control module 225, a localization module 290, a local HD map store 275, an HD map system interface 280, and an HD map application programming interface (API) 205. The various modules of the vehicle computing system 120 may be configured to process various types of data including sensor data 230, a behavior model 235, routes 240, and physical constraints 245. In some embodiments, the vehicle computing system 120 may contain more or fewer modules. The functionality described as being implemented by a particular module may be implemented by other modules.

With reference to FIG. 2 and FIG. 1, in some embodiments, the vehicle computing system 120 may include a perception module 210. The perception module 210 may be configured to receive sensor data 230 from the vehicle sensors 105 of the vehicles 150. The sensor data 230 may include data collected by cameras of the car, LIDAR, IMU, GPS navigation system, etc. The perception module 210 may also be configured to use the sensor data 230 to determine what objects are around the corresponding vehicle 150, the details of the road on which the corresponding vehicle 150 is travelling, etc. In addition, the perception module 210 may be configured to process the sensor data 230 to populate data structures storing the sensor data 230 and to provide the information or instructions to a prediction module 215 of the vehicle computing system 120.

The prediction module 215 may be configured to interpret the data provided by the perception module 210 using behavior models of the objects perceived to determine whether an object may be moving or likely to move. For example, the prediction module 215 may determine that objects representing road signs may not be likely to move, whereas objects identified as vehicles, people, etc., may either be in motion or likely to move. The prediction module 215 may also be configured to use behavior models 235 of various types of objects to determine whether they may be likely to move. In addition, the prediction module 215 may also be configured to provide the predictions of various objects to a planning module 200 of the vehicle computing system 120 to plan the subsequent actions that the corresponding vehicle 150 may take next.

The planning module 200 may be configured to receive information describing the surroundings of the corresponding vehicle 150 from the prediction module 215 and a route 240 that may indicate a destination of the vehicle 150 and that may indicate the path that the vehicle 150 may take to get to the destination.

The planning module 200 may also be configured to use the information from the prediction module 215 and the route 240 to plan a sequence of actions that the vehicle 150 may to take within a short time interval, for example, within the next few seconds. In some embodiments, the planning module 200 may be configured to specify a sequence of actions as one or more points representing nearby locations that the corresponding vehicle 150 may drive through next. The planning module 200 may be configured to provide, to the control module 225, the details of a plan comprising the sequence of actions to be taken by the corresponding vehicle 150. The plan may indicate the subsequent action or actions of the corresponding vehicle 150, for example, whether the corresponding vehicle 150 may perform a lane change, a turn, an acceleration by increasing the speed or slowing down, etc.

The control module 225 may be configured to determine the control signals that may be sent to the vehicle controls 130 of the corresponding vehicle 150 based on the plan that may be received from the planning module 200. For example, if the corresponding vehicle 150 is currently at point A and the plan specifies that the corresponding vehicle 150 should next proceed to a nearby point B, the control module 225 may determine the control signals for the vehicle controls 130 that may cause the corresponding vehicle 150 to go from point A to point B in a safe and smooth way, for example, without taking any sharp turns or a zig zag path from point A to point B. The path that may be taken by the corresponding vehicle 150 to go from point A to point B may depend on the current speed and direction of the corresponding vehicle 150 as well as the location of point B with respect to point A. For example, if the current speed of the corresponding vehicle 150 is high, the corresponding vehicle 150 may take a wider turn compared to another vehicle driving slowly.

The control module 225 may also be configured to receive physical constraints 245 as input. The physical constraints 245 may include the physical capabilities of the corresponding vehicle 150. For example, the corresponding vehicle 150 having a particular make and model may be able to safely make certain types of vehicle movements such as acceleration and turns that another vehicle with a different make and model may not be able to make safely. In addition, the control module 225 may be configured to incorporate the physical constraints 245 in determining the control signals for the vehicle controls 130 of the corresponding vehicle 150. In addition, the control module 225 may be configured to send control signals to the vehicle controls 130 that may cause the corresponding vehicle 150 to execute the specified sequence of actions and may cause the corresponding vehicle 150 to move according to a predetermined set of actions. In some embodiments, the aforementioned steps may be constantly repeated every few seconds and may cause the corresponding vehicle 150 to drive safely along the route that may have been planned for the corresponding vehicle 150.

The various modules of the vehicle computing system 120 including the perception module 210, prediction module 215, and planning module 220 may be configured to receive map information to perform their respective computations. The corresponding vehicle 150 may store the HD map data in the local HD map store 275. The modules of the vehicle computing system 120 may interact with the map data using an HD map API 205.

The HD map API 205 may provide one or more application programming interfaces (APIs) that can be invoked by a module for accessing the map information. The HD map system interface 280 may be configured to allow the vehicle computing system 120 to interact with the online HD map system 110 via a network (not illustrated in the Figures). The local HD map store 275 may store map data in a format that may be specified by the online HD map system 110. The HD map API 205 may be configured to process the map data format as provided by the online HD map system 110. The HD map API 205 may be configured to provide the vehicle computing system 120 with an interface for interacting with the HD map data. The HD map API 205 may include several APIs including a localization API 250, a landmark map API 255, a 3D map API 265, a route API 270, a map update API 285, etc.

The localization API 250 may be configured to determine the current location of the corresponding vehicle 150, for example, where the corresponding vehicle 150 is with respect to a given route. The localization API 250 may be configured to include a localized API that determines a location of the corresponding vehicle 150 within an HD map and within a particular degree of accuracy. The vehicle computing system 120 may also be configured to use the location as an accurate (e.g., within a certain level of accuracy) relative position for making other queries, for example, feature queries, navigable space queries, and occupancy map queries further described herein.

The localization API 250 may be configured to receive inputs comprising one or more of, location provided by GPS, vehicle motion data provided by IMU, LIDAR scanner data, camera images, etc. The localization API 250 may be configured to return an accurate location of the corresponding vehicle 150 as latitude and longitude coordinates. The coordinates that may be returned by the localization API 250 may be more accurate compared to the GPS coordinates used as input, for example, the output of the localization API 250 may have precision ranging within from 2-30 cm. In some embodiments, the vehicle computing system 120 may be configured to invoke the localization API 250 to determine the location of the corresponding vehicle 150 periodically based on the LIDAR using scanner data, for example, at a frequency of 10 Hertz (Hz).

The vehicle computing system 120 may also be configured to invoke the localization API 250 to determine the vehicle location at a higher rate (e.g., 60 Hz) if GPS or IMU data is available at that rate. In addition, vehicle computing system 120 may be configured to store as internal state, location history records to improve accuracy of subsequent localization calls. The location history record may store history of location from the point-in-time, when the corresponding vehicle 150 was turned off/stopped, etc. The localization API 250 may include a localize-route API that may be configured to generate an accurate (e.g., within a specified degree of accuracy) route specifying lanes based on the HD maps. The localize-route API may be configured to receive as input a route from a source to a destination via one or more third-party maps and may be configured to generate a high precision (e.g., within a specified degree of precision such as within 30 cm) route represented as a connected graph of navigable lanes along the input routes based on HD maps.

The landmark map API 255 may be configured to provide a geometric and semantic description of the world around the corresponding vehicle 150, for example, description of various portions of lanes that the corresponding vehicle 150 is currently travelling on. The landmark map APIs 255 comprise APIs that may be configured to allow queries based on landmark maps, for example, fetch-lanes API and fetch-features API. The fetch-lanes API may be configured to provide lane information relative to the corresponding vehicle 150 and the fetch-features API. The fetch-lanes API may also be configured to receive, as input, a location, for example, the location of the corresponding vehicle 150 specified using latitude and longitude and return lane information relative to the input location. In addition, the fetch-lanes API may be configured to specify a distance parameter indicating the distance relative to the input location for which the lane information may be retrieved. Further, the fetch-features API may be configured to receive information identifying one or more lane elements and to return landmark features relative to the specified lane elements. The landmark features may include, for each landmark, a spatial description that may be specific to the type of landmark.

The 3D map API 265 may be configured to provide access to the spatial 3-dimensional (3D) representation of the road and various physical objects around the road as stored in the local HD map store 275. The 3D map APIs 265 may include a fetch-navigable-surfaces API and a fetch-occupancy-grid API. The fetch-navigable-surfaces API may be configured to receive as input identifiers for one or more lane elements and return navigable boundaries for the specified lane elements. The fetch-occupancy-grid API may also be configured to receive a location as input, for example, a latitude and a longitude of the corresponding vehicle 150, and return information describing occupancy for the surface of the road and all objects available in the HD map near the location.

The information describing occupancy may include a hierarchical volumetric grid of some or all positions considered occupied in the HD map. The occupancy grid may include information at a high resolution near the navigable areas, for example, at curbs and bumps, and relatively low resolution in less significant areas, for example, trees and walls beyond a curb. In addition, the fetch-occupancy-grid API may be configured to detect obstacles and to change direction, if necessary.

The 3D map APIs 265 may also include map-update APIs, for example, download-map-updates API and upload-map-updates API. The download-map-updates API may be configured to receive as input a planned route identifier and download map updates for data relevant to all planned routes or for a specific planned route. The upload-map-updates API may be configured to upload data collected by the vehicle computing system 120 to the online HD map system 110. The upload-map-updates API may allow the online HD map system 110 to keep the HD map data stored in the online HD map system 110 up—to-date based on changes in map data that may be observed by sensors of vehicles 150 driving along various routes.

The route API 270 may be configured to return route information including a full route between a source and destination and portions of a route as the corresponding vehicle 150 travels along the route. The 3D map API 265 may be configured to allow querying of the online HD map system 110. The route APIs 270 may include an add-planned-routes API and a get-planned-route API. The add-planned-routes API may be configured to provide information describing planned routes to the online HD map system 110 so that information describing relevant HD maps may be downloaded by the vehicle computing system 120 and kept up to date. The add-planned-routes API may be configured to receive as input, a route specified using polylines expressed in terms of latitudes and longitudes and also a time-to-live (TTL) parameter specifying a time period after which the route data may be deleted. Accordingly, the add-planned-routes API may be configured to allow the vehicle 150 to indicate the route the vehicle 150 is planning on taking in the near future as an autonomous trip. The add-planned-route API may also be configured to align the route to the HD map, record the route and its TTL value, and determine that the HD map data for the route stored in the vehicle computing system 120 is up—to-date. The get-planned-routes API may be configured to return a list of planned routes and to provide information describing a route identified by a route identifier.

The map update API 285 may be configured to manage operations related to updating of map data, both for the local HD map store 275 and for the HD map store 165 stored in the online HD map system 110. Accordingly, modules in the vehicle computing system 120 may be configured to invoke the map update API 285 for downloading data from the online HD map system 110 to the vehicle computing system 120 for storing in the local HD map store 275. The map update API 285 may also be configured to allow the vehicle computing system 120 to determine whether the information monitored by the vehicle sensors 105 indicates a discrepancy in the map information provided by the online HD map system 110 and upload data to the online HD map system 110 that may result in the online HD map system 110 updating the map data stored in the HD map store 165 that is provided to other vehicles 150.

Figure 3:
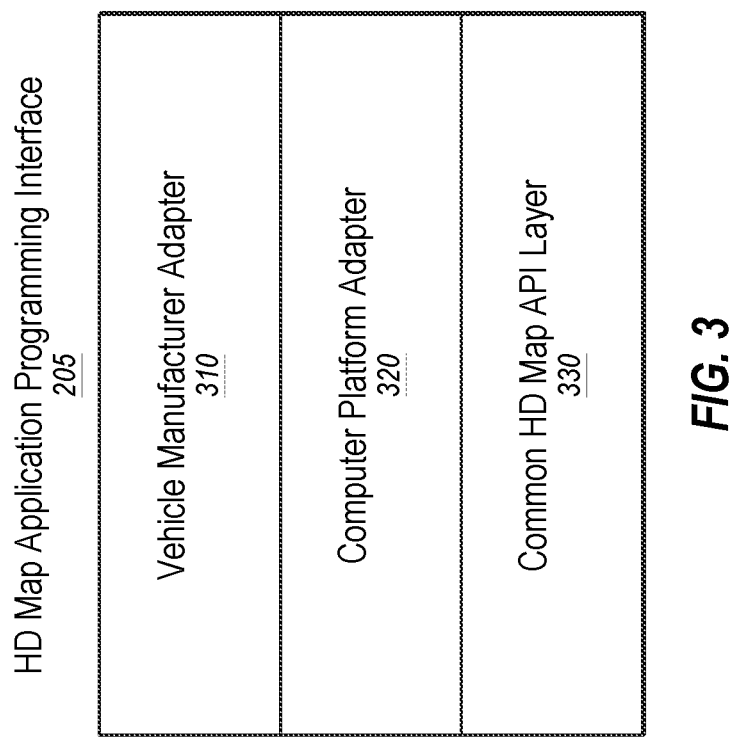
FIG. 3 illustrates an example of various layers of instructions in an HD map application programming interface of a vehicle computing system.

FIG. 3 illustrates an example of various layers of instructions in the HD map API 205 of the vehicle computing system 120. Different manufacturers of vehicles may have different procedures or instructions for receiving information from vehicle sensors 105 and for controlling the vehicle controls 130. Furthermore, different vendors may provide different computer platforms with autonomous driving capabilities, for example, collection and analysis of vehicle sensor data. Examples of a computer platform for autonomous vehicles include platforms provided vendors, such as NVIDIA, QUALCOMM, and INTEL. These platforms may provide functionality for use by autonomous vehicle manufacturers in the manufacture of autonomous vehicles 150. A vehicle manufacturer may use any one or several computer platforms for autonomous vehicles 150.

The online HD map system 110 may be configured to provide a library for processing HD maps based on instructions specific to the manufacturer of the vehicle and instructions specific to a vendor specific platform of the vehicle. The library may provide access to the HD map data and may allow the vehicle 150 to interact with the online HD map system 110.

As illustrated in FIG. 3, the HD map API 205 may be configured to be implemented as a library that includes a vehicle manufacturer adapter 310, a computer platform adapter 320, and a common HD map API layer 330. The common HD map API layer 330 may be configured to include generic instructions that may be used across a plurality of vehicle computer platforms and vehicle manufacturers. The computer platform adapter 320 may be configured to include instructions that may be specific to each computer platform. For example, the common HD map API layer 330 may be configured to invoke the computer platform adapter 320 to receive data from sensors supported by a specific computer platform. The vehicle manufacturer adapter 310 may be configured to include instructions specific to a vehicle manufacturer. For example, the common HD map API layer 330 may be configured to invoke functionality provided by the vehicle manufacturer adapter 310 to send specific control instructions to the vehicle controls 130.

The online HD map system 110 may be configured to store computer platform adapters 320 for a plurality of computer platforms and vehicle manufacturer adapters 310 for a plurality of vehicle manufacturers. The online HD map system 110 may be configured to determine the particular vehicle manufacturer and the particular computer platform for a specific autonomous vehicle 150. The online HD map system 110 may also be configured to select the vehicle manufacturer adapter 310 for the particular vehicle manufacturer and the computer platform adapter 320 the particular computer platform of that specific vehicle 150. In addition, the online HD map system 110 may be configured to send instructions of the selected vehicle manufacturer adapter 310 and the selected computer platform adapter 320 to the vehicle computing system 120 of that specific autonomous vehicle. The vehicle computing system 120 of that specific autonomous vehicle may be configured to install the received vehicle manufacturer adapter 310 and the computer platform adapter 320. The vehicle computing system 120 may also be configured to periodically verify whether the online HD map system 110 has an update to the installed vehicle manufacturer adapter 310 and the computer platform adapter 320. In addition, if a more recent update is available compared to the version installed on the vehicle 150, the vehicle computing system 120 may be configured to request and receive the latest update and to install it.

HD Map System Architecture

FIG. 4 illustrates an example system architecture of the online HD map system 110. The online HD map system 110 may be configured to include a map creation module 410, a map update module 420, a map data encoding module 430, a load balancing module 440, a map accuracy management module 450, the vehicle interface module 160, a localization module 460, and the HD map store 165. Some embodiments of online HD map system 110 may be configured to include more or fewer modules than shown in FIG. 4. Functionality indicated as being performed by a particular module may be implemented by other modules. In some embodiments, the online HD map system 110 may be configured to be a distributed system comprising a plurality of processing systems.

The map creation module 410 may be configured to create HD map data of HD maps from the sensor data collected from several vehicles 150 that are driving along various routes. The map update module 420 may be configured to update previously computed HD map data by receiving more recent information (e.g., sensor data) from vehicles 150 that recently travelled along routes on which map information changed. For example, certain road signs may have changed or lane information may have changed as a result of construction in a region, and the map update module 420 may be configured to update the HD maps and corresponding HD map data accordingly. The map data encoding module 430 may be configured to encode the HD map data to be able to store the data efficiently (e.g., compress the HD map data) as well as send the HD map data to vehicles 150. The load balancing module 440 may be configured to balance loads across vehicles 150 such that requests to receive data from vehicles 150 are distributed across different vehicles 150 in a relatively uniform manner (e.g., the load distribution between different vehicles 150 is within a threshold amount of each other). The map accuracy management module 450 may be configured to maintain relatively high accuracy of the HD map data using various techniques even though the information received from individual vehicles may not have the same degree of accuracy. The localization module 460 may be configured to perform actions similar to those performed by the localization module 290 of FIG. 2.

Figure 5:
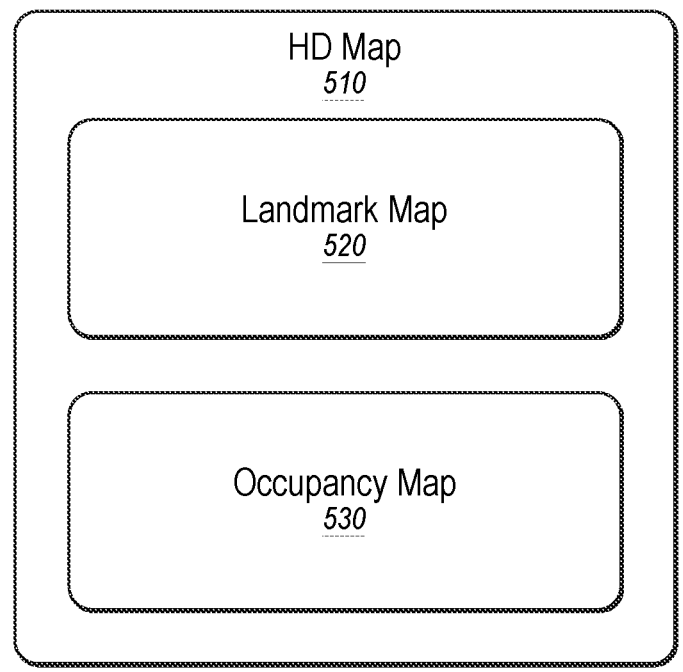
FIG. 5 illustrates example components of an HD map.

FIG. 5 illustrates example components of an HD map 510. The HD map 510 may include HD map data of maps of several geographical regions. In the present disclosure, reference to a map or an HD map, such as HD map 510, may include reference to the map data that corresponds to such map. Further, reference to information of a respective map may also include reference to the map data of that map.

In some embodiments, the HD map 510 of a geographical region may include a landmark map (LMap) 520 and an occupancy map (OMap) 530. The landmark map 520 may comprise information describing lanes including spatial location of lanes and semantic information about each lane. The spatial location of a lane may comprise the geometric location in latitude, longitude, and elevation at high prevision, for example, precision within 30 cm or better. The semantic information of a lane comprises restrictions such as direction, speed, type of lane (for example, a lane for going straight, a left turn lane, a right turn lane, an exit lane, and the like), restriction on crossing to the left, connectivity to other lanes, etc.

In these or other embodiments, the landmark map 520 may comprise information describing stop lines, yield lines, spatial location of cross walks, safely navigable space, spatial location of speed bumps, curb, road signs comprising spatial location, type of all signage that is relevant to driving restrictions, etc. Examples of road signs described in an HD map 510 may include stop signs, traffic lights, speed limits, one-way, do-not-enter, yield (vehicle, pedestrian, animal), etc.

In some embodiments, the occupancy map 530 may comprise a spatial 3-dimensional (3D) representation of the road and physical objects around the road. The data stored in an occupancy map 530 may also be referred to herein as occupancy grid data. The 3D representation may be associated with a confidence score indicative of a likelihood of the object existing at the location. The occupancy map 530 may be represented in a number of other ways. In some embodiments, the occupancy map 530 may be represented as a 3D mesh geometry (collection of triangles) which may cover the surfaces. In some embodiments, the occupancy map 530 may be represented as a collection of 3D points which may cover the surfaces. In some embodiments, the occupancy map 530 may be represented using a 3D volumetric grid of cells at 5-10 cm resolution. Each cell may indicate whether or not a surface exists at that cell, and if the surface exists, a direction along which the surface may be oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore, the online HD map system 110 and the vehicle computing system 120 may use data compression techniques to be able to store and transfer map data thereby reducing storage and transmission costs. Accordingly, the techniques disclosed herein may help improve the self-driving of autonomous vehicles by improving the efficiency of data storage and transmission with respect to self-driving operations and capabilities.

In some embodiments, the HD map 510 does may not use or rely on data that may typically be included in maps, such as addresses, road names, ability to geo-code an address, and ability to compute routes between place names or addresses. The vehicle computing system 120 or the online HD map system 110 may access other map systems, for example, GOOGLE MAPS, to obtain this information. Accordingly, a vehicle computing system 120 or the online HD map system 110 may receive navigation instructions from a tool such as GOOGLE MAPS into a route and may convert the information to a route based on the HD map 510 or may convert the information such that it may be compatible for us on the HD map 510.

Geographical Regions in HD Maps

The online HD map system 110 may divide a large physical area into geographical regions and may store a representation of each geographical region. Each geographical region may represent a contiguous area bounded by a geometric shape, for example, a rectangle or square. In some embodiments, the online HD map system 110 may divide a physical area into geographical regions of similar size independent of the amount of data needed to store the representation of each geographical region. In some embodiments, the online HD map system 110 may divide a physical area into geographical regions of different sizes, where the size of each geographical region may be determined based on the amount of information needed for representing the geographical region. For example, a geographical region representing a densely populated area with a large number of streets may represent a smaller physical area compared to a geographical region representing sparsely populated area with very few streets. In some embodiments, the online HD map system 110 may determine the size of a geographical region based on an estimate of an amount of information that may be used to store the various elements of the physical area relevant for the HD map.

In some embodiments, the online HD map system 110 may represent a geographic region using an object or a data record that may include various attributes including: a unique identifier for the geographical region; a unique name for the geographical region; a description of the boundary of the geographical region, for example, using a bounding box of latitude and longitude coordinates; and a collection of landmark features and occupancy grid data.

Figure 6A:
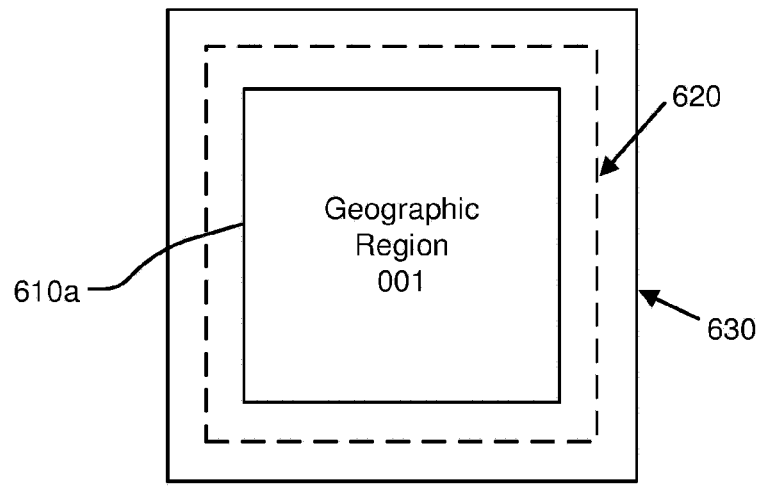
FIGS. 6A-6B illustrate example geographical regions defined in an HD map.
Figure 6B:
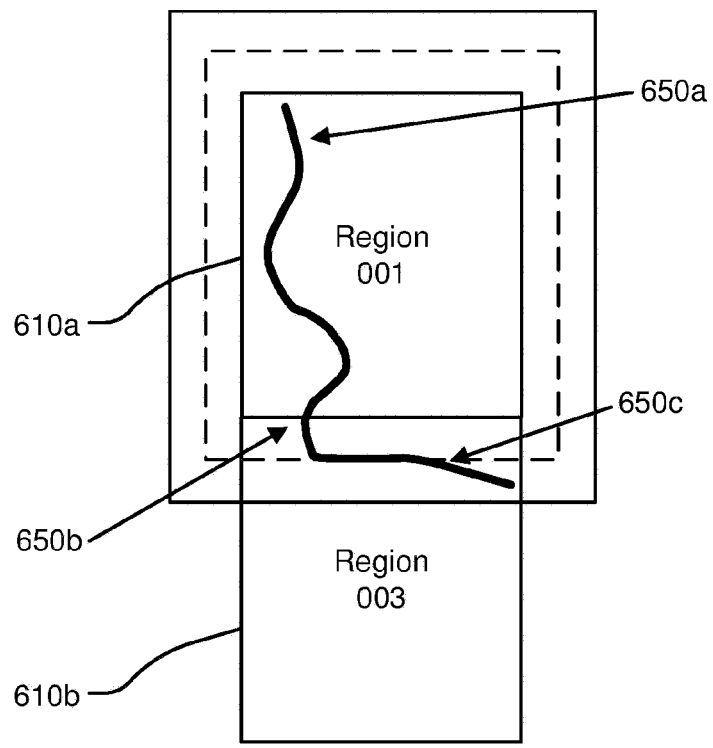

FIGS. 6A-6B illustrate example geographical regions 610*a* and 610*b* that may be defined in an HD map according to one or more embodiments. FIG. 6A illustrates a square geographical region 610*a*. FIG. 6B illustrates two neighboring geographical regions 610*a* and 610*b*. The online HD map system 110 may store data in a representation of a geographical region that may allow for transitions from one geographical region to another as a vehicle 150 drives across geographical region boundaries.

In some embodiments, as illustrated in FIG. 6, each geographic region may include a buffer of a predetermined width around it. The buffer may comprise redundant map data around one or more sides e of a geographic region. In these or other embodiments, the buffer may be around every side of a particular geographic region. Therefore, in some embodiments, where the geographic region may be a certain shape, the geographic region may be bounded by a buffer that may be a larger version of that shape. By way of example, FIG. 6A illustrates a boundary 620 for a buffer of approximately 50 m around the geographic region 610*a* and a boundary 630 for a buffer of approximately 100 m around the geographic region 610*a*.

In some embodiments, the vehicle computing system 120 may switch the current geographical region of the corresponding vehicle 150 from one geographical region to a neighboring geographical region when the corresponding vehicle 150 crosses a predetermined threshold distance within the buffer. For example, as shown in FIG. 6B, the corresponding vehicle 150 may start at location 650*a* in the geographical region 610*a*. The corresponding vehicle 150 may traverse along a route to reach a location 650*b* where it may cross the boundary of the geographical region 610 but may stay within the boundary 620 of the buffer. Accordingly, the vehicle computing system 120 of the corresponding vehicle 150 may continue to use the geographical region 610*a* as the current geographical region of the vehicle. Once the corresponding vehicle 150 crosses the boundary 620 of the buffer at location 650*c*, the vehicle computing system 120 may switch the current geographical region of the corresponding vehicle 150 to geographical region 610*b* from geographical region 610*a*. The use of a buffer may reduce or prevent rapid switching of the current geographical region of a vehicle 150 as a result of the vehicle 150 travelling along a route that may closely track a boundary of a geographical region.

Lane Representations in HD Maps

The HD map system 100 may represent lane information of streets in HD maps. Although the embodiments described may refer to streets, the techniques may be applicable to highways, alleys, avenues, boulevards, paths, etc., on which vehicles 150 may travel. The HD map system 100 may use lanes as a reference frame for purposes of routing and for localization of the vehicle 150. The lanes represented by the HD map system 100 may include lanes that are explicitly marked, for example, white and yellow striped lanes, lanes that may be implicit, for example, on a country road with no lines or curbs but may nevertheless have two directions of travel, and implicit paths that may act as lanes, for example, the path that a turning car may make when entering a lane from another lane.

The HD map system 100 may also store information relative to lanes, for example, landmark features such as road signs and traffic lights relative to the lanes, occupancy grids relative to the lanes for obstacle detection, and navigable spaces relative to the lanes so the vehicle 150 may plan/react in emergencies when the vehicle 150 makes an unplanned move out of the lane. Accordingly, the HD map system 100 may store a representation of a network of lanes to allow the vehicle 150 to plan a legal path between a source and a destination and to add a frame of reference for real-time sensing and control of the vehicle 150. The HD map system 100 stores information and provides APIs that may allow a vehicle 150 to determine the lane that the vehicle 150 is currently in, the precise location of the vehicle 150 relative to the lane geometry, and other relevant features/data relative to the lane and adjoining and connected lanes.

Figure 7:
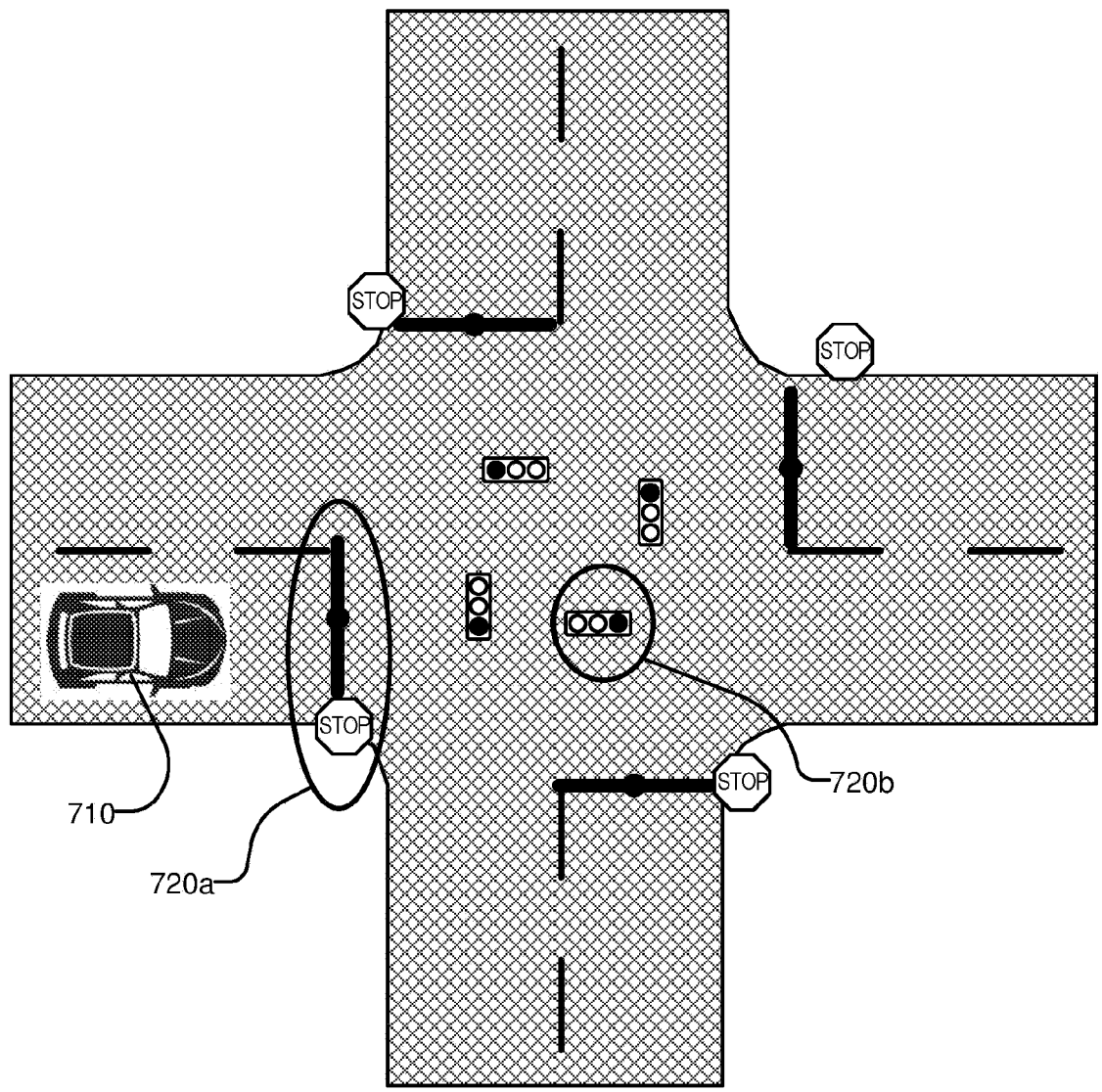
FIG. 7 illustrates example representations of lanes in an HD map.

FIG. 7 illustrates example lane representations in an HD map. FIG. 7 illustrates a vehicle 710 at a traffic intersection. The HD map system 100 provides the vehicle 710 with access to the map data that may be relevant for autonomous driving of the vehicle 710. This may include, for example, features 720*a* and 720*b* that may be associated with the lane but may not be the closest features to the vehicle 710. Therefore, the HD map system 100 may store a lane-centric representation of data that may represent the relationship of the lane to the feature so that the vehicle 710 can efficiently extract the features given a lane.

The HD map data may represent portions of the lanes as lane elements. The lane elements may specify the boundaries of the lane and various constraints including the legal direction in which a vehicle may travel within the lane element, the speed with which the vehicle may drive within the lane element, whether the lane element may be for left turn only, or right turn only, etc. In some embodiments, the HD map data may represent a lane element as a continuous geometric portion of a single vehicle lane. The HD map system 100 may store objects or data structures that may represents lane elements that may comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations, etc., as part of the HD map data.

Examples of lane elements represented by the HD map data may include, a piece of a right lane on a freeway, a piece of a lane on a road, a left turn lane, the turn from a left turn lane into another lane, a merge lane from an on-ramp an exit lane on an off-ramp, and a driveway. The HD map data may represent a one-lane road using two lane elements, one for each direction. The HD map system 100 may represents median turn lanes that may be shared similar to a one-lane road.

Figure 8A:
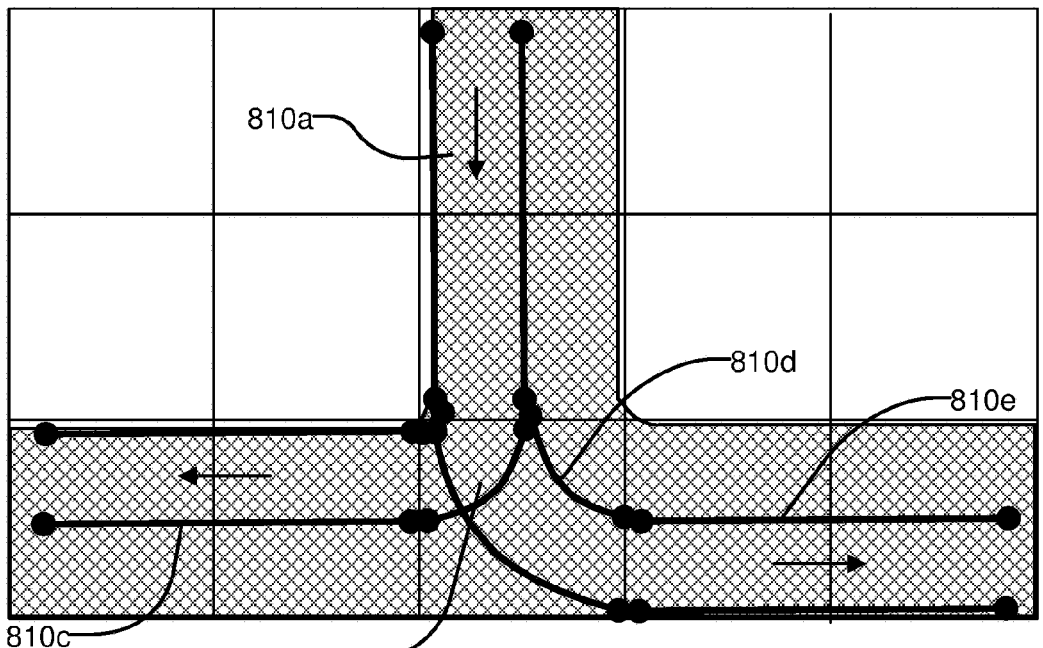
FIGS. 8A-8B illustrates example lane elements and relationships between lane elements in an HD map.
Figure 8B:
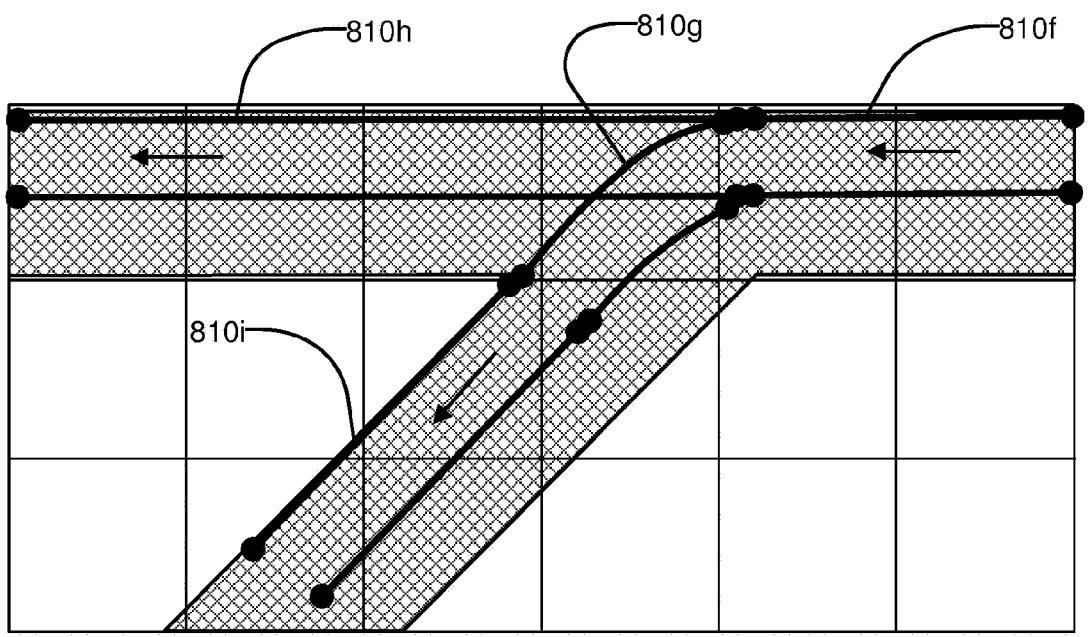

FIGS. 8A-B illustrate lane elements and relations between lane elements in an HD map. FIG. 8A illustrates an example of a T-junction in a road illustrating a lane element 810*a* that may be connected to lane element 810*c* via a turn lane 810*b* and is connected to lane 810*e* via a turn lane 810*d*. FIG. 8B illustrates an example of a Y-junction in a road illustrating label 810*f* connected to lane 810*h* directly and connected to lane 810i via lane 810g. The HD map system 100 may determine a route from a source location to a destination location as a sequence of connected lane elements that can be traversed to reach from the source location to the destination location.

Localization Using Map Constrainedness

A vehicle computing system 120 may perform localization to determine an estimate of a vehicles state (e.g., position, orientation, velocity, acceleration) relative to an HD map at a particular point in time. The estimate determined may include error. To safely utilize a vehicle state estimate, it may be important to understand how accurate the estimate is and determine a measure of confidence in the estimate.

In some embodiments, a covariance of state parameters may include an N×N matrix of the joint variability of the state parameters, which may represent the uncertainty of the parameters under a gaussian error model as a hyper-ellipsoid. Also, a confidence interval may include a range of values for a state parameter. Further, a confidence may include the estimated likelihood that the actual value of the state falls in the confidence interval. Further, the system disclosed herein for determining constrainedness may include the vehicle computing system 120 or the online HD map system 110, or some combination thereof.

In some embodiments, a localization process may be performed by the vehicle computing system 120 receiving various sensor inputs and then using them to estimate the state $X_i(t)$ at the time that sensor i data was acquired, each of which may have an associated covariance, such as $\Sigma_i$ for sensor i.

In some embodiments, the vehicle computing system 120 may perform a fusion process (e.g., using techniques such as Kalman filtering) to merge this state and covariance information over time so that a better state estimate can be determined. The vehicle computing system 120 may also use the fusion process to predict the state at a future time t. Such predictions may produce added uncertainty that may depend upon how far into the future the prediction is made.

The online HD map system 110 may determine, along with localization, meaningful confidence measures for estimated vehicle states (e.g., uncertainties that reflect the expected estimation accuracy). The online HD map system 110 may factor these uncertainties into a combination of map related $C_{Map}$ and localization related $C_{Localization}$ uncertainty measures, which may also be considered as static/offline and dynamic/online components, respectively:

$$C = f(C_{Map}, C_{Localization})$$

The system may determine map uncertainty $C_{Map}$ as a value inherent to the static environment as represented by the map, that relates to the presence and/or absence of constraining structures. The system may measure how well the static environment constrains a given vehicle pose in the map, assuming full observability by means of some sensor (e.g., LIDAR with sufficient range, resolution, and field of view). In the following, this quantity may be referred to as map constrainedness. The map constrainedness value may be low if there are only very few geometric features that constrain vehicle poses with respect to the map (e.g., in large parking lots, wide open areas, and along certain highway stretches). On the other hand, in urban settings with plenty of buildings and other structures, the map constrainedness value may be comparably large, which means that vehicle poses are well constrained. In principle, map uncertainty may present a lower bound for the achievable estimation accuracy, and may also correlate strongly with the expected robustness.

The system may also determine a measure of localization uncertainty $C_{Localization}$ that is inherent to an online localization process and the sensor data. This measure may quantify the effects of sensor characteristics, sensor data uncertainties, dynamic objects and changes, as well as algorithmic approximations.

Therefore, the system may determine a measure of constrainedness from 3D HD maps. The measure may describe how well the localization is constrained at a given vehicle pose (e.g., when aligning new sensor data to the map at the given pose). The system may execute relatively fast and scalable methods to compute the constrainedness measure given 3D HD maps. The system may execute methods to incorporate the map constrainedness measure during localization as a contributing factor to the measurement uncertainty. This may include methods to fuse different estimates of the measurement covariance (e.g., as derived from the map constrainedness, measured from pose estimates, and implied by the alignment algorithms). The system may execute methods to measure confidence based on localization convergence analysis.

Point-to-Plane Iterative Closest Point (ICP) Algorithm

Given two point clouds with N corresponding point pairs $[p_i \in P, q_i \in Q]$, the system may execute a point-to-plane ICP process that estimates the transform $[R, t]$ that minimizes the correspondence distances by means of the following minimum least squares problem. Without loss of generality, the normals $n_i$ may be associated with each point $p_i$ in the point cloud P.

$$E(R,t) = \min \Sigma_{i=1}^{N}((R \cdot p_i + t - q_i) \cdot n_i)^2 \quad R \in \Re^{3\times 3} \; t = (t_x, t_y, t_z) \quad (1)$$

If the rotation R is small, it can be linearized by means of Euler angles as a 3×1 vector r of rotations around the x, y, and z axes:

$$E(r,t) = \min \Sigma_{i=1}^{n}((p_i - q_i) \cdot n_i + t \cdot n_i + r \cdot (p_i \times n_i))^2 \; t=(t_x,t_y,t_z) \; r=(r_x,r_y,r_z) \quad (2)$$

Taking the partial derivatives of Equation (2) may lead to the following system of linear equations:

$$Cx = b \quad x = (r_x, r_y, r_z, t_x, t_y, t_z) \quad C \in \Re^{6\times 6} \quad (3)$$

$$C = \frac{1}{N}\sum_{i=1}^{n} c_i c_i^t \quad c = \begin{bmatrix} p_i \times n_i \\ n_i \end{bmatrix}$$

$$C_{Rot} = \frac{1}{N}\sum_{i=1}^{n}(p_i \times n_i) \cdot (p_i \times n_i)^T \quad C_{Trans} = \frac{1}{N}\sum_{i=1}^{n} n_i n_i^T \quad (4)$$

The matrix C, known as the Fisher information matrix, may be an estimate of the Hessian of the cost function of point-to-plane ICP as given in Equation (1). The first and last three elements of $c_i$ may describe the rotation and translation constraints, also referred to as "torque" and "force", respectively. $C_{Rot}$ and $C_{Trans}$, as shown in Equation (4), present the rotation and translation constraints referring to the upper-left and lower-right 3×3 block of the information matrix C, respectively. It can be seen from $C_{Rot}$ that rotations are better constrained by point correspondences further away. However, this implies that the scale of $C_{Rot}$ is proportional to the square of the average range of the contributing points, see Equation (5). Similarly, the off-diagonal 3×3 blocks scale proportional to the average range. While this range dependency is desirable, it may entail special consideration when deriving the covariance matrix from the information matrix as discussed later.

$$r_i = |p_i| \hat{p}_i = \frac{p_i}{r_i} p_i = r_i \hat{p}_i (p_i \times n_i) \cdot (p_i \times n_i)^T = r_i^2 \cdot (\hat{p}_i \times n_i) \cdot (p_i \times n_i)^T \quad (5)$$

The translation constraints $C_{Trans}$ measure the variation of local surface-normals. If all normals are the same, moving one of the point clouds within the plane defined by these normals does not change the resulting correspondence error. Thus, the solution has two degrees of freedom. Similarly, given points sampled from two planes with normals [100] and [010], the solution has one degree of freedom, (i.e., any solution $[r_s, t_s+\lambda \cdot [001]^T]$ minimizes Equation (1) equally well). This may mean that for certain geometric configuration the information matrix is rank-deficient. Representing C in terms of its eigen decomposition, eigenvectors corresponding to small eigenvalues define transformations that move the two point clouds with respect to each other, while introducing only small changes in the resulting errors. Accordingly, weak and strong constraints are indicated by small and large eigenvalues, respectively. Thus, the information matrix effectively describes how well the solution $[r_s t_s]$ is constrained with respect to the six parameters.

Assuming that the residual point correspondence errors are zero-mean Gaussian distributed with variance $\sigma^2$, the covariance matrix $\Sigma$ is computed from the information matrix C as $\Sigma = \sigma^2 C^{-1}$. The variance $\sigma^2$ makes the covariance a metric measurement. It is estimated as the root-mean-squared error (RMSE) of the correspondence residuals.

Map Constrainedness

Choosing, without loss of generality, that point cloud P refers to the map points, the system may determine an information matrix C that depends on the selected map points. Thus, the system may compute the information matrix C using all map points visible from a given vehicle pose subject to a maximum range. The resulting information matrix may describe how well the given vehicle pose is constrained under the assumption that all selected map points are observed and that all correspondences are correct. In other words, the resulting information matrix may represent a best case measure of local constrainedness as an inherent property of the static map. This measure is referred to herein as map constrainedness.

As noted above, map constrainedness may be computed for discrete vehicle poses. For sensors with a full 360 degree horizontal field of view, the map constrainedness may be rotation-invariant with respect to the vehicle pose and the vertical rotation axis (e.g., it may only be computed for different vehicle positions, but not for different orientations).

Since the constrainedness matrix may technically be an information matrix, all considerations from the previous sections apply here as well. In particular, when representing the map constrainedness for a given vehicle pose in terms of its eigen decomposition, weak and strong constraints may be indicated by small and large eigenvalues, respectively. In some embodiments, constrainedness measures with respect to x and y may be visualized as ellipses using the respective eigenvalues and eigenvectors. In these embodiments, the system may use 3D LIDAR for map building and localization. Altitude, roll, and pitch are usually well constrained in this deployment due to observing the road surface. The lateral direction is typically well constrained due to various structures along the road. Such structures also constrain the yaw angle (e.g., the rotation around the vertical axis). The forward direction is in certain scenarios poorly constrained or unconstrained.

The notion of map constrainedness can similarly be applied to image-based localization, where the map also contains 3D points. In this case, the orientation may usually be much better constrained than the 3D position. When using a single camera, the map constrainedness may be computed for vehicle positions and orientations.

In some embodiments, which may include a featureless wall and corner, and example a top-down view may include ellipses displaying the x-y components of the map constrainedness. As the car moves along the featureless wall, the constrainedness perpendicular to the wall may be large, while the constrainedness parallel to the wall may be small. Further away from the wall the perpendicular constrainedness may decrease, and when the corner and other features are observed, the constrainedness along the two dimensions may become more equal.

In some embodiments that include highway and urban settings including crossing over a highway bridge, most structures may be parallel to the driving direction (e.g. building fronts, walls, and highway dividers). As a result, the largest constrainedness measures may be mostly perpendicular to these surfaces, which implies that the lateral-direction in vehicle coordinates is typically much stronger constrained than the longitudinal direction. This may be particularly clear when driving across the bridge.

Building the Constrainedness Map

Figure 9:
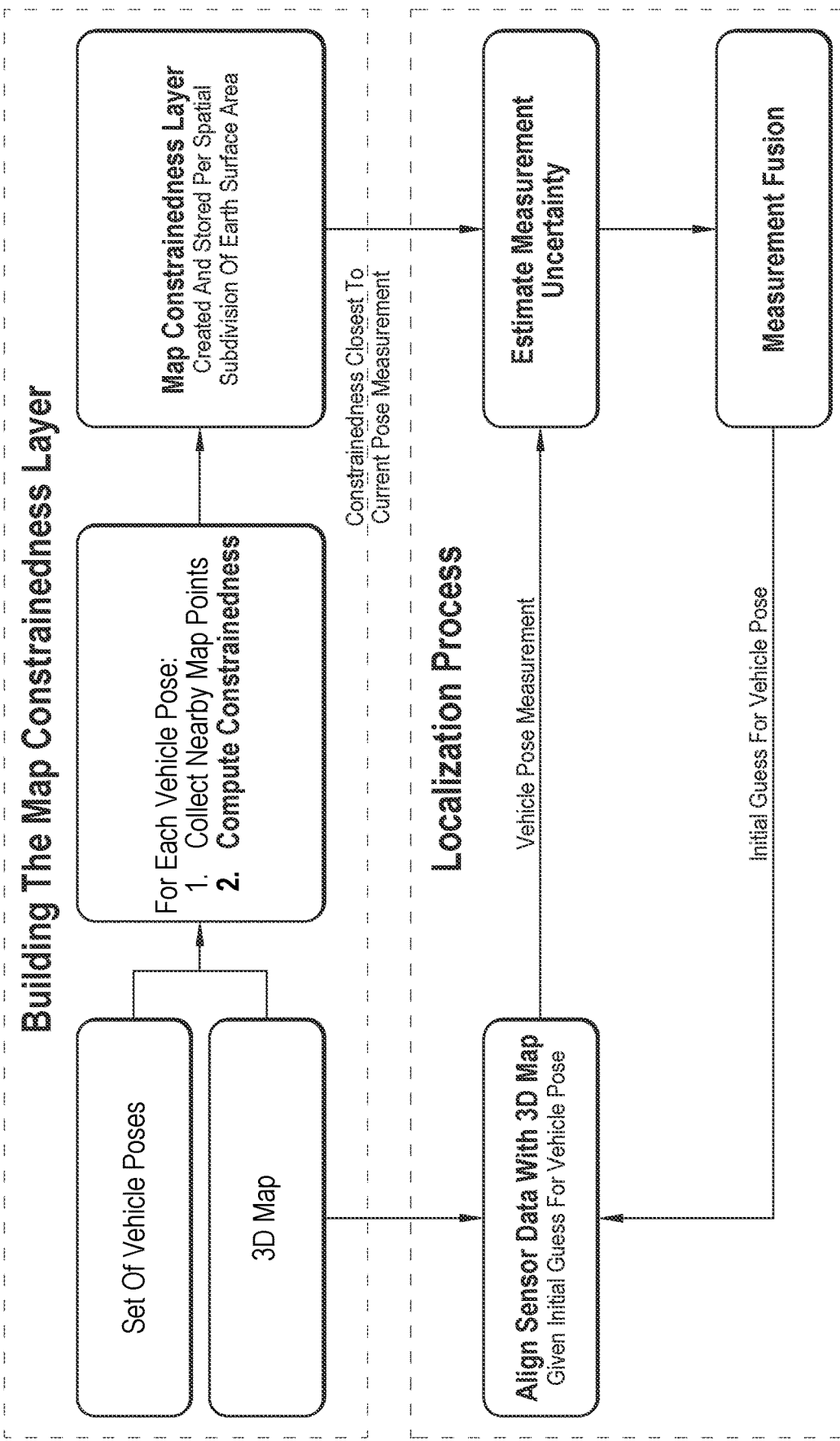
FIG. 9 illustrates a flowchart of an example method of creating a map constrainedness layer and of using constrainedness values in a localization process.

FIG. 9 illustrates a flowchart of an example method of creating a map constrainedness layer and of using constrainedness values in a localization process. More particularly, FIG. 9 provides a conceptual overview of the creation and use of the map constrainedness layer. The HD map system 100 may build a 3D map comprising a collection of 3D points representing the 3D geometry of the deployment area. Given the 3D map and a set of vehicle poses, the system may compute constrainedness values for each pose from map points nearby the pose. The system may store the computed measures in a designated map constrainedness layer or map data. In a localization process, the system may align new sensor data with the 3D map given an initial guess for the vehicle pose. The resulting vehicle pose estimate may be used to retrieve the closest constrainedness measures from the map constrainedness layer, which in turn may factor into the estimated measurement uncertainty. The following sections detail each of these actions.

Selecting Vehicle Poses

Generally, map constrainedness may slowly over space (e.g., for small displacements, the implied viewpoint changes may not result in significantly different constrainedness measures). Therefore it may be sufficient to compute constrainedness for discrete poses sampled from the deployment area. More specifically, vehicle poses may only be sampled from navigable areas, which implies that poses are locally sampled from smooth and continuous surfaces. For sensors with a full 360 degree horizontal field of view, the map constrainedness may be rotation-invariant with respect to the vehicle pose (e.g., map constrainedness may only be computed for different vehicle positions, but not for different orientations).

In some embodiments, the system may discretize the local surface by means of a 2D grid and choses the grid cell centers as the representative vehicle poses. This may be the most efficient approach, however, many of the resulting poses may not be reachable by vehicles (e.g., on sidewalks, close to curbs etc.), which means the system may not compute or store these values. Furthermore, the resulting discrete poses may not be guaranteed to be representative of or close to common vehicle trajectories, which may reduce their accuracy and applicability.

In some embodiments, the system may sample randomly from the navigable areas, possibly choosing the sample density to be proportional to the rate of change in local constrainedness, and denser close to known vehicle trajectories (e.g., lane center lines). On its own this approach may generate too many vehicle poses, and may occasionally select vehicle poses close together. However, combining this approach with a grid-based surface discretization as described above may provide a viable vehicle pose selection.

In some embodiments, the system may select vehicle poses using reference sensor data. The vehicle poses associated with sensor data used for map building may be rendered into the grid-based surface discretization as described above. Constrainedness values may be computed for grid cells that contain a minimum number of vehicle poses. The reference vehicle pose as stored in the map constrainedness layer may be derived from the poses in a given grid cell by any mechanism, for example, computing the average, selecting randomly, selecting the closest to the grid-center, or other similar mechanisms. This approach assumes that during the mapping process, vehicles traversed all lanes and mostly drove along centerlines. Furthermore, it is assumed that the constrainedness measures for vehicle poses between centerlines is usually well approximated by the measure from the nearest centerline pose.

Selecting Map Points

In some embodiments, the system may compute map constrainedness for a given vehicle pose using all map points visible from that pose subject to a maximum range. In the following, several processes are described to solve the problem of selecting the map points for a given vehicle pose.

In some embodiments, the system may select all points within a certain radius of the vehicle pose, but may only use the points which can be viewed from the given vehicle pose. Technically, this may be the optimal solution, because it uses all map points that could possibly be observed from the given vehicle pose. However, this implies occlusion tests (e.g., via ray-tracing from the map points to the vehicle pose), which may be prohibitively expensive for realistic maps and numbers of vehicle poses. The situation may improve by performing the reverse ray-tracing starting from a simulated sensor to map points using adequate field of view and resolution. While this does not involve all viewable map points, it may approximate the optimal constrainedness measures arbitrary well, dependent only on the field of view and resolution. Nevertheless, the implied cost for computing the map constrainedness in this fashion may still be very high.

In some embodiments, the simplest and most straightforward approach may be to select and use all points within a certain radius of the vehicle pose. This greedy point selection may frequently include points which are occluded when viewing the scene from the given vehicle pose. This method may not perform well with objects such as buildings and bushes in which many of the points within the radius of the vehicle will never be visible. Including these points in the constrainedness computation may introduce systematic errors that result in overconfidence, which may derail the localization process. For example, in the case of a building side that is orthogonal to the road direction but hidden behind the building front that is facing towards the road, such that the building side can't be observed from the current pose, the points from the building side imply strong constraints in regards to the forward direction, which results in comparably small uncertainties for this aspect of the pose measurements. Consequently, the subsequent measurement fusion integrates this weak, and possibly wrong, measurement aspect much stronger than it should, which may lead to filter divergence.

In some embodiments, the system may select points using reference sensor data. In this case, the sensor data used for map building may be used as a proxy to find visible points. For example, for a given vehicle pose, the system may find sensor data collected at or near that pose, find correspondences between this sensor data and the map, and use the selected map points to compute the map constrainedness measures. This may be an approximation, because (1) not all map points visible from the given vehicle pose are incorporated, and (2) using the sensor data from nearby poses may include some map points that are not actually visible from the given vehicle pose.

Computing Map Constrainedness

In some embodiments, computing map constrainedness may include generating discrete vehicle poses (e.g., subsampling from 2D grids of navigable areas) and selecting all points within a certain radius of the vehicle pose, using only the points which can be viewed from the given vehicle pose. As discussed above, together these actions may be prohibitively expensive for realistic maps and numbers of vehicle poses and are likely to result in suboptimal pose distributions. Instead, in some embodiments, the system may drive the pose and map point selection by reference data (e.g., sensor data that was used for map building), as suggested above. Each sensor data may be associated with an alignment pose in the global reference frame as a result of the global alignment and mapping process.

In some embodiments, a combined and highly parallelizable process of selecting vehicle poses, selecting map points, and computing the constrainedness measures may adopt a divide-and-conquer paradigm and may be implemented as follows:

1. Discretize the earth surface into local regions.
2. Discretize local regions into 2D grids with some resolution. The processing of local regions may be performed independently and in parallel.
3. Assign all alignment poses that fall into this local region to the appropriate grid cells.
4. Alignment poses may contribute to some constrainedness measure, if they fall into grid cells that contain a minimum number of alignment poses. For all such alignment poses the following steps may be performed independently and in parallel:
    a. Retrieve the sensor data associated with the given alignment pose.
    b. Find correspondences to the map subject to a small search radius.
    c. Compute the constrainedness measure according to Equation (3).
    d. Store the resulting constrainedness $C_i$ and the number of map points $N_i$.
5. For all grid cells that contain a minimum number of alignment poses:
    a. Pick a reference vehicle pose (e.g., as the average of all poses, by random selection, or as the pose closest to the grid cell center).
    b. Retrieve all $C_i$ and $N_i$ referring to this grid cell.
    c. M is the number of alignment poses. Compute the constrainedness measure for the chosen reference vehicle pose as:

$$N_{total} = \sum_{i=1}^{M} N_i \quad C = \frac{1}{N_{total}} \sum_{i=1}^{M} N_i \cdot C_i \qquad (6)$$

Storing the Map Constrainedness Layer

The result of the process described above may be a set of reference vehicle poses per local region with their associated constrainedness measures. In line with other map layers, this data may be stored on network servers in compressed format for local regions. Note that the 6×6 constrainedness matrix is symmetric, thus, only the upper or lower triangular part may be stored. The constrainedness may be computed at all locations in the map where a vehicle is likely to be (e.g., on all locations of the roads). In addition, as the map is updated over time, the map constrainedness may be recomputed if a change occurs near enough to the map position (e.g., if change is within the LiDAR maximum range from the map point).

Using Map Constrainedness in the Localization Process

When a vehicle is scheduled to traverse a set of local regions, the relevant data (e.g., a 3D map, map constrainedness etc.) may be transferred to the vehicle and subsequently prepared for use in the localization process. For the constrainedness map, this may imply the creation of a search data structure per local region (e.g., a kd-tree) to support fast retrieval of constrainedness measures closest to a given query pose. In the localization process, new sensor data may be aligned with the 3D map given an initial guess for the vehicle pose. The resulting vehicle pose estimate may be used to retrieve the closest constrainedness measures from the map constrainedness layer. In some embodiments, the map constrainedness may be used directly as measurement uncertainty, with the covariance computed from the constrainedness matrix as described above. In some embodiments, the map constrainedness may be combined with uncertainties, which in turn may factor into the estimated measurement uncertainty.

In some embodiments, the constrainedness map can be consumed in live localization. For example, the localizer may query the constrainedness map based on its current best estimation of the position. The constrainedness values may also be used directly as the inverse of measurement uncertainty in the Kalman filter to mix with the uncertainties from the existing sensors.

Computing Constrainedness from Current Sensor Data

In some embodiments, map constrainedness may measure how well the localization solution is constrained at a given vehicle pose under the assumption that there are no occlusions, perfect correspondences, 360-degree horizontal field of view, and relatively large resolution. In other words, it may provide a lower, ideal bound for the uncertainty of the localization estimates. In the localization process, the current sensor data may have a smaller field of view and/or resolution, and part of the view may be occluded by dynamic objects (e.g., objects like vehicles that are not represented in the map). If dynamic objects are detected and the respective measurements removed from the current sensor data, then Equation (3) may be directly applied to the resulting sensor data to compute the current constrainedness. This measure may be generally smaller or equal to the map constrainedness at the given pose. The corresponding uncertainty may be equal or larger than the uncertainty derived from map constrainedness.

The computation of the current constrainedness may entail normals as per Equation (3). In some embodiments, the system may compute normals from the current sensor data after measurements from dynamic objects were removed. This method may be applied independent of the alignment with the map. The accuracy of the resulting constrainedness measure may depend heavily on the normal accuracy, data density, and field of view. Normal estimation errors may be caused by sensor noise and local measurement sparsity, which usually increase with the distance from the sensor. In addition, it may not be feasible to compute normals for all data points in the current sensor data due to run-time constraints. In some embodiments, the system may use normals from map points. This method may be applied after the current sensor data was aligned with the map, because the resulting pose estimate may be used to find correspondences between the current sensor data and the map subject to a maximum distance threshold. The corresponding map points with their normals may be used to compute the constrainedness measure. In principle, the accuracy of normals computed from the map may be higher than for normals from the current sensor data, because the map may be much denser. It may not be feasible to find correspondences for all data points in the current sensor data due to run-time constraints.

If the map contains normals, normals from the map may be used to compute the constrainedness value after the correspondence finding, which may be used as a live constrainedness value. Alternatively, the system may take the scan used to localize and compute normals for that scan, then compute the constrainedness using all points from the scan that match the map within a certain tolerance (e.g., 10 cm). The constrainedness computed this way may generally match the map constrainedness. Once computed, the system may use this constrainedness to directly compute the localization uncertainty of the current scan. The system may also use this computed constrainedness and compare it with the map constrainedness for the nearest position in the map.

Figure 10:
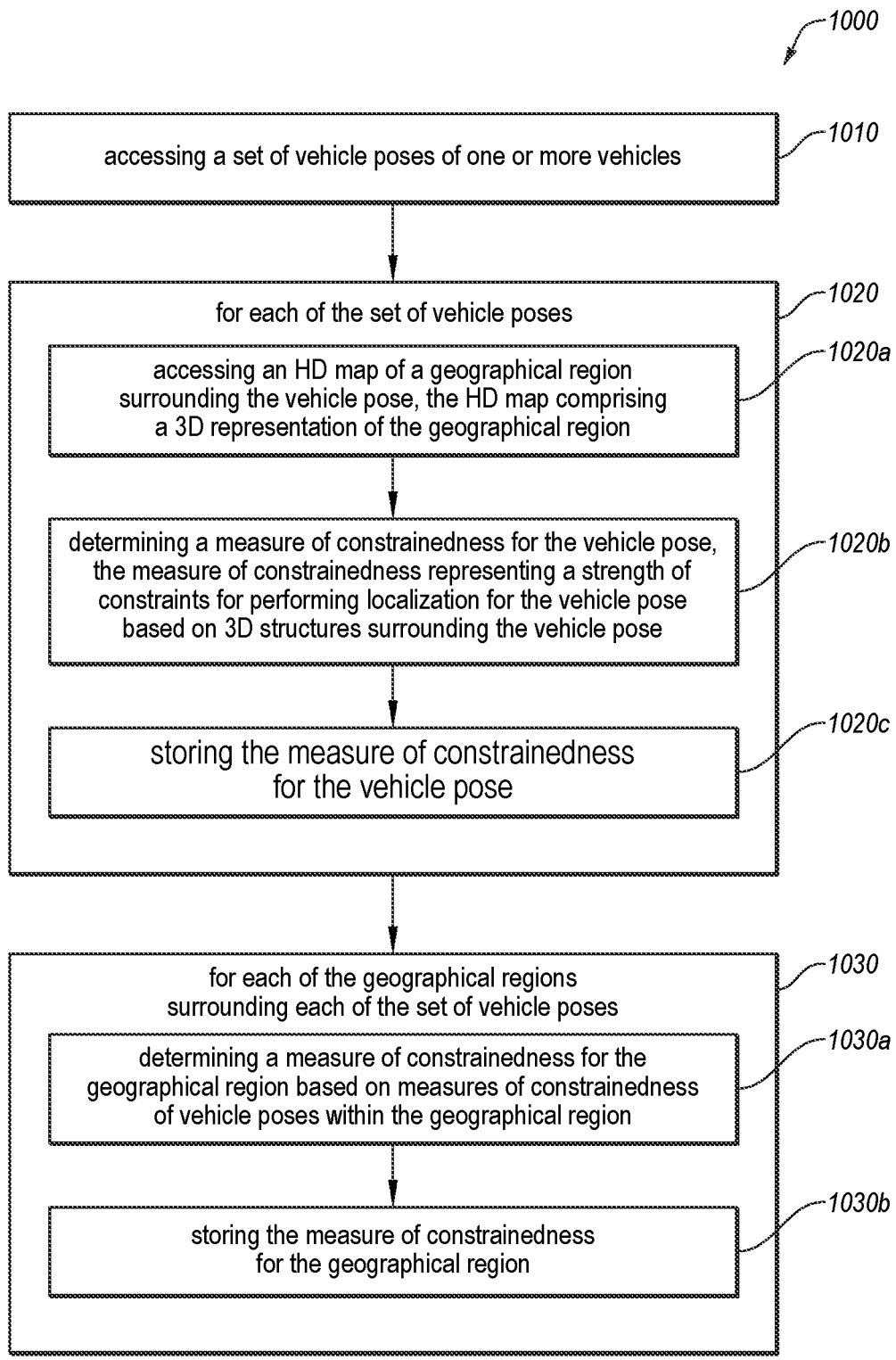
FIG. 10 illustrates a flowchart of an example method of using measure of constrainedness in HD maps for localization of vehicles.

FIG. 10 illustrates a flowchart of an example method 1000 of using measure of constrainedness in HD maps for localization of vehicles. The method 1000 may be performed by any suitable system, apparatus, or device. For example, one or more elements of the HD map system 100 of FIG. 1 may be configured to perform one or more of the operations of the method 1000. Additionally or alternatively, the computer system 1100 of FIG. 11 may be configured to perform one or more of the operations associated with the method 1000. Although illustrated with discrete blocks, the actions and operations associated with one or more of the blocks of the method 1000 may be divided into additional blocks, combined into fewer blocks, or eliminated, depending on the particular implementation.

The method 1000 may include, at action 1010, accessing a set of vehicle poses of one or more vehicles. In some embodiments, each of the set of vehicle poses may include a geographic location and an orientation of the vehicle. For example, the localization module 460 of the online HD map system 110 may access, at action 1010, a set of vehicle poses of the vehicles 150a-150d. In this example, each of the vehicle poses may include a geographic location and an orientation of the vehicle.

The method 1000 may include, at action 1020, for each of the set of vehicle poses, at action 1020a, accessing an HD map of a geographical region surrounding the vehicle pose, the HD map comprising a 3D representation of the geographical region, at action 1020b, determining a measure of constrainedness for the vehicle pose, the measure of constrainedness representing a strength of constraints (e.g., confidence) for performing localization for the vehicle pose based on 3D structures surrounding the vehicle pose and, at action 1020c, storing the measure of constrainedness for the vehicle pose. For example, the localization module 460 of the online HD map system 110 may, at action 1020, for each of the set of vehicle poses, access, at action 1020, accessing the HD map 510 of a geographical region surrounding the vehicle pose, the HD map 510 including an occupancy map 530 that includes a 3D representation of the geographical region, determine, at action 1020b, a measure of constrainedness for the vehicle pose, the measure of constrainedness representing a confidence for performing localization for the vehicle pose based on 3D structures surrounding the vehicle pose, and store, at action 1020c, the measure of constrainedness for the vehicle pose.

In some embodiments, the measure of constrainedness for each of the set of vehicle poses is determined based on a rate of convergence of a localization process along a particular direction. In some embodiments, the measure of constrainedness for each of the set of vehicle poses may include a plurality of constrainedness values corresponding to a plurality of directions.

The method 1000 may include, at action 1030, for each of the geographical regions surrounding each of the set of vehicle poses, at action 1030a, determining a measure of constrainedness for the geographical region based on measures of constrainedness of vehicle poses within the geographical region, and at action 1030b, storing the measure of constrainedness for the geographical region. In some embodiments, the measure of constrainedness for each of the geographical regions surrounding each of the set of vehicle poses may be stored in a layer of an HD map of the geographical region. For example, the localization module 460 of the online HD map system 110 may, at action 1030, for each of the geographical regions surrounding each of the set of vehicle poses, determine, at action 1030a, a measure of constrainedness for the geographical region based on measures of constrainedness of vehicle poses within the geographical region, and store, at action 1030b, the measure of constrainedness for the geographical region. In this example, the measure of constrainedness for each of the geographical regions surrounding each of the set of vehicle poses may be stored in a layer of an HD map 510 of the geographical region.

Subsequent to the action 1030, the method 1000 may employ the stored measure of constrainedness for a geographical region in gathering data to update the HD map store 165 for the geographical region, and/or in navigating a vehicle, such as the vehicle 150a or another non-autonomous vehicle, through the for the geographical region. Further, the method 1000 may be employed repeatedly as the vehicle 150a navigates along a road. For example, the method 1000 may be employed with the vehicle 150a (or another non-autonomous vehicle) starts driving, and then may be employed repeatedly during the navigation of the vehicle 150a (or another non-autonomous vehicle). The vehicle 150a may navigate by sending control signals to controls of the vehicle 150a. The method 1000 may be employed by the vehicle computing system 120a of the vehicle 150a to use the measure of constrainedness for a geographical region as a measure of uncertainty in a Kalman filter used for localization of the vehicle 150a located in the geographical region.

Computer System Architecture

Figure 11:
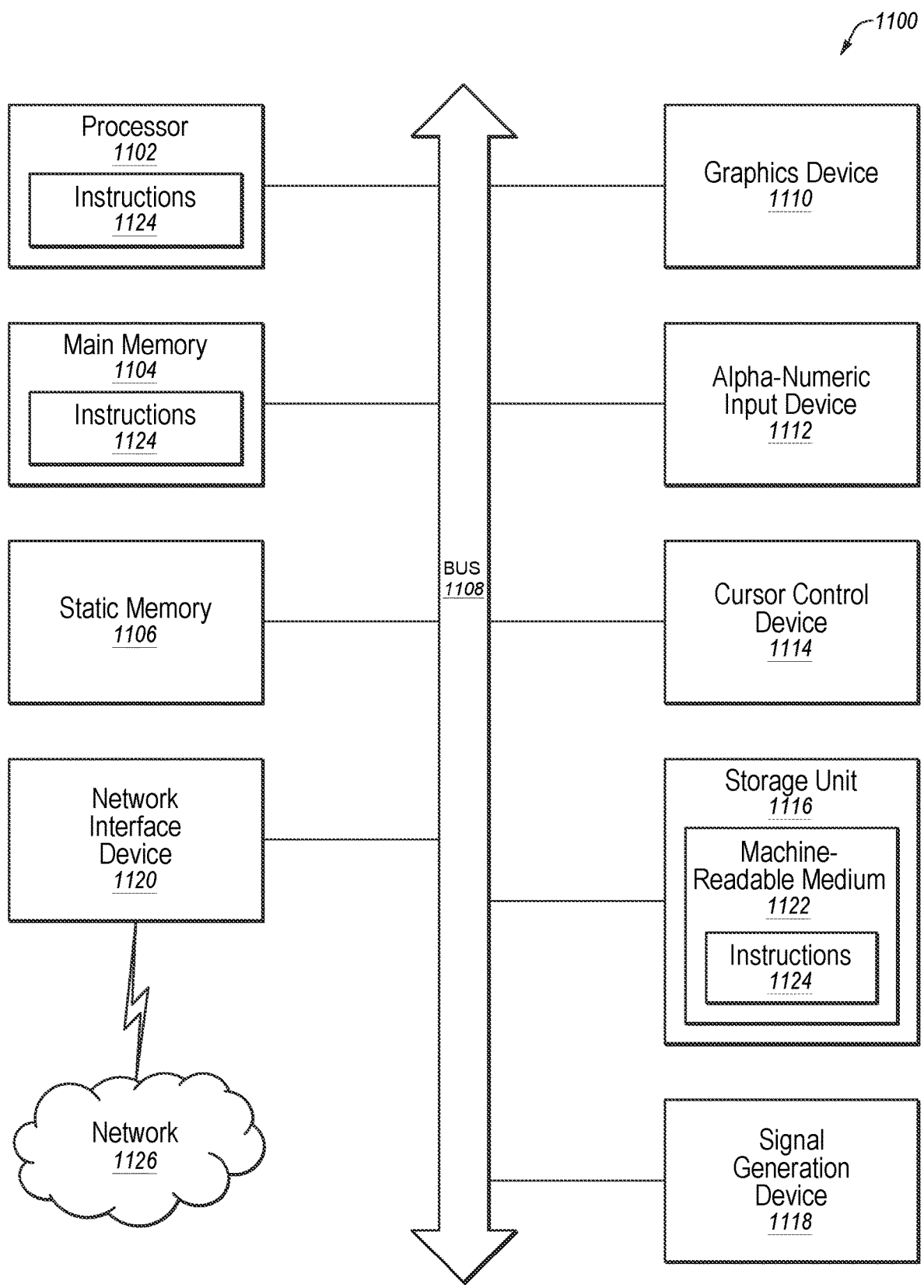
FIG. 11 illustrates an example embodiment of a computing machine that can read instructions from a machine-readable medium and execute the instructions in a processor or controller.

FIG. 11 is a block diagram illustrating components of an example computer system able to read instructions from a machine-readable medium and execute them in a processor (or controller). Specifically, FIG. 11 shows a diagrammatic representation of a machine in the example form of a computer system 1100 within which instructions 1124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1124 (sequential or otherwise) that specify actions to be taken by that machine. Further, while only a single machine is illustrated, the term "machine" shall also be taken to include any collection of machines that individually or jointly execute instructions 1124 to perform any one or more of the methodologies discussed herein.

The example computer system 1100 may be part of or may be any applicable system described in the present disclosure. For example, the online HD map system 110 and/or the vehicle computing systems 110 described above may comprise the computer system 1100 or one or more portions of the computer system 1100. Further, different implementations of the computer system 1100 may include more or fewer components than those described herein. For example, a particular computer system 1100 may not include one or more of the elements described herein and/or may include one or more elements that are not explicitly discussed.

The example computer system 1100 includes a processor 1102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1104, and a static memory 1106, which are configured to communicate with each other via a bus 1108. The computer system 1100 may further include graphics display unit 1110 (e.g., a plasma display panel (PDP), a liquid crystal display (LCD), a projector, or a cathode ray tube (CRT)). The computer system 1100 may also include alphanumeric input device 1112 (e.g., a keyboard), a cursor control device 1114 (e.g., a mouse, a trackball, a joystick, a motion sensor, or other pointing instrument), a storage unit 1116, a signal generation device 1118 (e.g., a speaker), and a network interface device 1120, which also are configured to communicate via the bus 1108.

The storage unit 1116 includes a machine-readable medium 1122 on which is stored instructions 1124 (e.g., software) embodying any one or more of the methodologies or functions described herein. The instructions 1124 (e.g., software) may also reside, completely or at least partially, within the main memory 1104 or within the processor 1102 (e.g., within a processor's cache memory) during execution thereof by the computer system 1100, the main memory 1104 and the processor 1102 also constituting machine-readable media. The instructions 1124 (e.g., software) may be transmitted or received over a network 1126 via the network interface device 1120.

While machine-readable medium 1122 is shown in an example embodiment to be a single medium, the term "machine-readable medium" should be taken to include a single medium or multiple media (e.g., a centralized or distributed database, or associated caches and servers) able to store instructions (e.g., instructions 1124). The term "machine-readable medium" shall also be taken to include any medium that is capable of storing instructions (e.g., instructions 1124) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although the techniques described herein are applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein can also be applied for displaying maps for purposes of computer simulation, for example, in computer games, and so on.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc.", or "at least one of A, B, or C, etc." or "one or more of A, B, or C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:
    determining a confidence level indicative of an accuracy of performing localization of an ego-machine within a region using map data representing a map associated with the region, wherein the confidence level is determined based at least in part on an amount of three-dimensional (3D) structures in the region; and
    localizing the ego-machine within the region based at least in part on the confidence level and the map data.

2. The method of claim 1, wherein the confidence level is further determined based at least on:
    one or more positions within the region; and
    respective map data that corresponds to a respective area that is within a threshold range of a respective position of the one or more positions.

3. The method of claim 1, wherein the confidence level is further determined based at least on a measure of uncertainty determined using a Kalman filter.

4. The method of claim 1, wherein the confidence level is further determined based at least on a rate of convergence of a localization process performed with respect to a position within the region.

5. The method of claim 1, wherein the confidence level is a first confidence level when the amount of 3D structures is a first amount and the confidence level is a second confidence level when the amount of 3D structures is a second amount, further wherein the first confidence level is greater than the second confidence level and the first amount of 3D structures is greater than the second amount of 3D structures.

6. The method of claim 1, further comprising associating the confidence level with the map data representing a map associated with the region.

7. The method of claim 1, wherein the confidence level is determined with respect to a particular position within the region that is located along a driving surface within the region.

8. The method of claim 7, wherein the confidence level is determined with respect to a direction from the particular position that is lateral from a directionality of the driving surface at the particular position.

9. A system comprising:
    one or more processing units to:
        determine a confidence level indicative of an accuracy of performing localization of a machine within a region using map data representing a map associated with the region, the confidence level being determined based at least on:
            a presence of 3D structures in the region, wherein the confidence level increases as the presence of 3D structures increases;
            one or more positions within the region; and
            respective map data that corresponds to a respective area that is within a threshold range of at least one respective position of the one or more positions, the map data corresponding to a map that is associated with the region; and
        perform one or more localization operations with respect to the machine and within the region based at least in part on the confidence level and the map data.

10. The system of claim 9, wherein the confidence level is further determined based at least on a rate of convergence of a localization process performed with respect to the at least one respective position within the region.

11. The system of claim 9, wherein the confidence level is determined with respect to one or more of:
    a LIDAR sensor; or
    a camera sensor.

12. The system of claim 9, wherein the one or more positions are located along a driving surface within the region.

13. The system of claim 12, wherein the confidence level is determined with respect to a respective direction corresponding to the at least one respective position of the one or more positions, wherein the respective direction is lateral from a directionality of the driving surface at the at least one respective position.

14. A system comprising:
    one or more processing units to:
        perform localization to determine a pose of an ego-machine within a region based at least on map data corresponding to a map associated with the region, the pose indicating a position of the ego-machine within the region;
        determine a confidence level of the determined pose based at least on an amount of 3D structures surrounding the position; and
        perform one or more operations based at least on the pose and the confidence level.

15. The system of claim 14, wherein the confidence level is determined based at least on a provided confidence level that is encoded in the map data used to perform the localization.

16. The system of claim 15, wherein the provided confidence level was determined based at least on a presence of 3D structures surrounding the position as determined at a time prior to the localization being performed.

17. The system of claim 15, wherein the provided confidence level is determined based at least on:
    one or more positions within the region; and
    respective map data that corresponds to a respective area that is within a threshold range of a respective position of the one or more positions.

18. The system of claim 14, wherein the confidence level is determined with respect to one or more of:
    a LIDAR sensor; or
    a camera sensor.

19. The system of claim 14, wherein the confidence level is determined with respect to a direction from the position, wherein the direction is lateral from a directionality of the ego-machine at the position.

20. The system of claim 14, wherein the directionality of the ego-machine is determined based at least on an orientation of the ego-machine that is represented by the pose.

* * * * *